United States Patent
Akl et al.

(10) Patent No.: US 11,743,757 B2
(45) Date of Patent: Aug. 29, 2023

(54) GRADUAL MIGRATION IN AN INTEGRATED ACCESS AND BACKHAUL (IAB) NETWORK

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 92 days.

(21) Appl. No.: 17/454,572

(22) Filed: Nov. 11, 2021

(65) Prior Publication Data
US 2022/0217570 A1    Jul. 7, 2022

Related U.S. Application Data

(60) Provisional application No. 63/134,149, filed on Jan. 5, 2021.

(51) Int. Cl.
*H04W 28/02*    (2009.01)
(52) U.S. Cl.
CPC ... *H04W 28/0263* (2013.01); *H04W 28/0226* (2013.01); *H04W 28/0231* (2013.01)

(58) Field of Classification Search
CPC ......... H04W 28/0226; H04W 28/0231; H04W 28/0263
See application file for complete search history.

(56) References Cited

U.S. PATENT DOCUMENTS

| | | | | |
|---|---|---|---|---|
| 2022/0182903 A1* | 6/2022 | Ishii | .................. | H04W 36/0058 |
| 2022/0217598 A1* | 7/2022 | Ishii | .................... | H04W 36/305 |
| 2022/0248296 A1* | 8/2022 | Merwaday | ............ | H04W 36/30 |
| 2022/0322464 A1* | 10/2022 | Luo | ........................ | H04W 76/10 |
| 2022/0369190 A1* | 11/2022 | Diao | ..................... | H04W 36/08 |
| 2023/0071471 A1* | 3/2023 | Park | ..................... | H04B 7/0617 |

FOREIGN PATENT DOCUMENTS

| WO | WO-2022087492 A1 * | 4/2022 |
|---|---|---|
| WO | WO-2022150339 A1 * | 7/2022 |
| WO | WO-2022157749 A1 * | 7/2022 |

* cited by examiner

*Primary Examiner* — Mehmood B. Khan
(74) *Attorney, Agent, or Firm* — Patterson + Sheridan, L.L.P.; Kevin T. Cheatham

(57) ABSTRACT

Aspects of the present disclosure provide techniques for handover in an Integrated Access and Backhaul (IAB) network or other type of network. One example method which may be performed by a source base station (BS) includes: determining to migrate a child node from a first logical IAB-distributed unit (DU) of an IAB-node to a second logical IAB-DU of the IAB-node, wherein the first logical IAB-DU is associated with the source BS, and wherein the second logical IAB-DU is associated with a target BS; sending, to the target BS, context information of the child node served by the first logical IAB-DU in response to the determination; and indicating, to the target BS, a traffic mapping configuration at the IAB-node associated with the context information and a backhaul connection of the IAB-node.

30 Claims, 16 Drawing Sheets

Initial Stage    Final Stage

Initial Stage  Final Stage

GRADUAL MIGRATION IN AN INTEGRATED ACCESS AND BACKHAUL (IAB) NETWORK

CROSS-REFERENCE TO RELATED APPLICATION(S)

This application claims benefit of and priority to U.S. Provisional Application No. 63/134,149, filed Jan. 5, 2021 which is hereby expressly incorporated by reference herein in its entirety as if fully set forth below and for all applicable purposes.

INTRODUCTION

Aspects of the present disclosure relate to wireless communications, and more particularly, to techniques for handover in an Integrated Access and Backhaul (IAB) network or other type of network.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink (DL) channels (e.g., for transmissions from a BS or DU to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless communication devices.

Aspects of the present disclosure provide techniques for handover in Integrated Access and Backhaul (IAB) network.

Certain aspects of the subject matter described in this disclosure can be implemented in a method for wireless communication by a source base station (BS). The method generally includes determining to migrate a child node from a first logical Integrated Access and Backhaul (IAB)-distributed unit (DU) of an IAB-node to a second logical IAB-DU of the IAB-node, wherein the first logical IAB-DU is associated with the source BS, and wherein the second logical IAB-DU is associated with a target BS; sending, to the target BS, context information of the child node served by the first logical IAB-DU in response to the determination; and indicating, to the target BS, a traffic mapping configuration at the IAB-node associated with the context information and a backhaul connection of the IAB-node.

Certain aspects of the subject matter described in this disclosure can be implemented in a method for wireless communication by a target BS. The method generally includes receiving, from a source BS, context information of a child node served by a first logical IAB-DU of an IAB-node associated with the source BS, wherein the context information is for migration of the child node from the first logical IAB-DU to a second logical IAB-DU of the IAB-node, wherein the second logical IAB-DU is associated with the target BS; receiving, from the source BS, a first traffic mapping configuration at the IAB-node associated with the context information and a backhaul connection of the IAB-node; establishing context of the child node at the second logical IAB-DU based on the context information; and sending second traffic mapping configuration to the IAB-node associated with the context established at the second logical IAB-DU and the backhaul connection of the IAB-node based on the first traffic mapping configuration.

Certain aspects of the subject matter described in this disclosure can be implemented in an apparatus for wireless communication by a source BS. The apparatus generally includes: a memory; and one or more processors coupled to the memory, the memory and the one or more processors being configured to: determine to migrate a child node from a first logical IAB-DU of an IAB-node to a second logical IAB-DU of the IAB-node, wherein the first logical IAB-DU is associated with the source BS, and wherein the second logical IAB-DU is associated with a target BS; send, to the target BS, context information of the child node served by the first logical IAB-DU in response to the determination; and indicate, to the target BS, a traffic mapping configuration at the IAB-node associated with the context information and a backhaul connection of the IAB-node.

Certain aspects of the subject matter described in this disclosure can be implemented in an apparatus for wireless communication by a target BS. The apparatus generally includes: a memory; and one or more processors coupled to the memory, the memory and the one or more processors being configured to: receive, from a source BS, context information of a child node served by a first logical IAB-DU of an IAB-node associated with the source BS, wherein the context information is for migration of the child node from the first logical IAB-DU to a second logical IAB-DU of the IAB-node, wherein the second logical IAB-DU is associated with the target BS; receive, from the source BS, a first traffic mapping configuration at the IAB-node associated with the context information and a backhaul connection of the IAB-node; establish context of the child node at the second logical IAB-DU based on the context information; and send second traffic mapping configuration to the IAB-node associated with the context established at the second logical IAB-DU and the backhaul connection of the IAB-node based on the first traffic mapping configuration.

Certain aspects of the subject matter described in this disclosure can be implemented in an apparatus for wireless communication by a source BS. The apparatus generally includes: means for determining to migrate a child node from a first logical IAB-DU of an IAB-node to a second logical IAB-DU of the IAB-node, wherein the first logical IAB-DU is associated with the source BS, and wherein the second logical IAB-DU is associated with a target BS; means for sending, to the target BS, context information of the child node served by the first logical IAB-DU in response to the determination; and means for indicating, to the target BS, a traffic mapping configuration at the IAB-node associated with the context information and a backhaul connection of the IAB-node.

Certain aspects of the subject matter described in this disclosure can be implemented in an apparatus for wireless communication by a target BS. The apparatus generally includes: means for receiving, from a source BS, context information of a child node served by a first logical IAB-DU of an IAB-node associated with the source BS, wherein the context information is for migration of the child node from the first logical IAB-DU to a second logical IAB-DU of the IAB-node, wherein the second logical IAB-DU is associated with the target BS; means for receiving, from the source BS, a first traffic mapping configuration at the IAB-node associated with the context information and a backhaul connection of the IAB-node; means for establishing context of the child node at the second logical IAB-DU based on the context information; and means for sending second traffic mapping configuration to the IAB-node associated with the context established at the second logical IAB-DU and the backhaul connection of the IAB-node based on the first traffic mapping configuration.

Certain aspects of the subject matter described in this disclosure can be implemented in a computer-readable medium having instructions stored thereon to cause a source BS to: determine to migrate a child node from a first logical IAB-DU of an IAB-node to a second logical IAB-DU of the IAB-node, wherein the first logical IAB-DU is associated with the source BS, and wherein the second logical IAB-DU is associated with a target BS; send, to the target BS, context information of the child node served by the first logical IAB-DU in response to the determination; and indicate, to the target BS, a traffic mapping configuration at the IAB-node associated with the context information and a backhaul connection of the IAB-node.

Certain aspects of the subject matter described in this disclosure can be implemented in a computer-readable medium having instructions stored thereon to cause a target BS to: receive, from a source BS, context information of a child node served by a first logical IAB-DU of an IAB-node associated with the source BS, wherein the context information is for migration of the child node from the first logical IAB-DU to a second logical IAB-DU of the IAB-node, wherein the second logical IAB-DU is associated with the target BS; receive, from the source BS, a first traffic mapping configuration at the IAB-node associated with the context information and a backhaul connection of the IAB-node; establish context of the child node at the second logical IAB-DU based on the context information; and send second traffic mapping configuration to the IAB-node associated with the context established at the second logical IAB-DU and the backhaul connection of the IAB-node based on the first traffic mapping configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure, and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
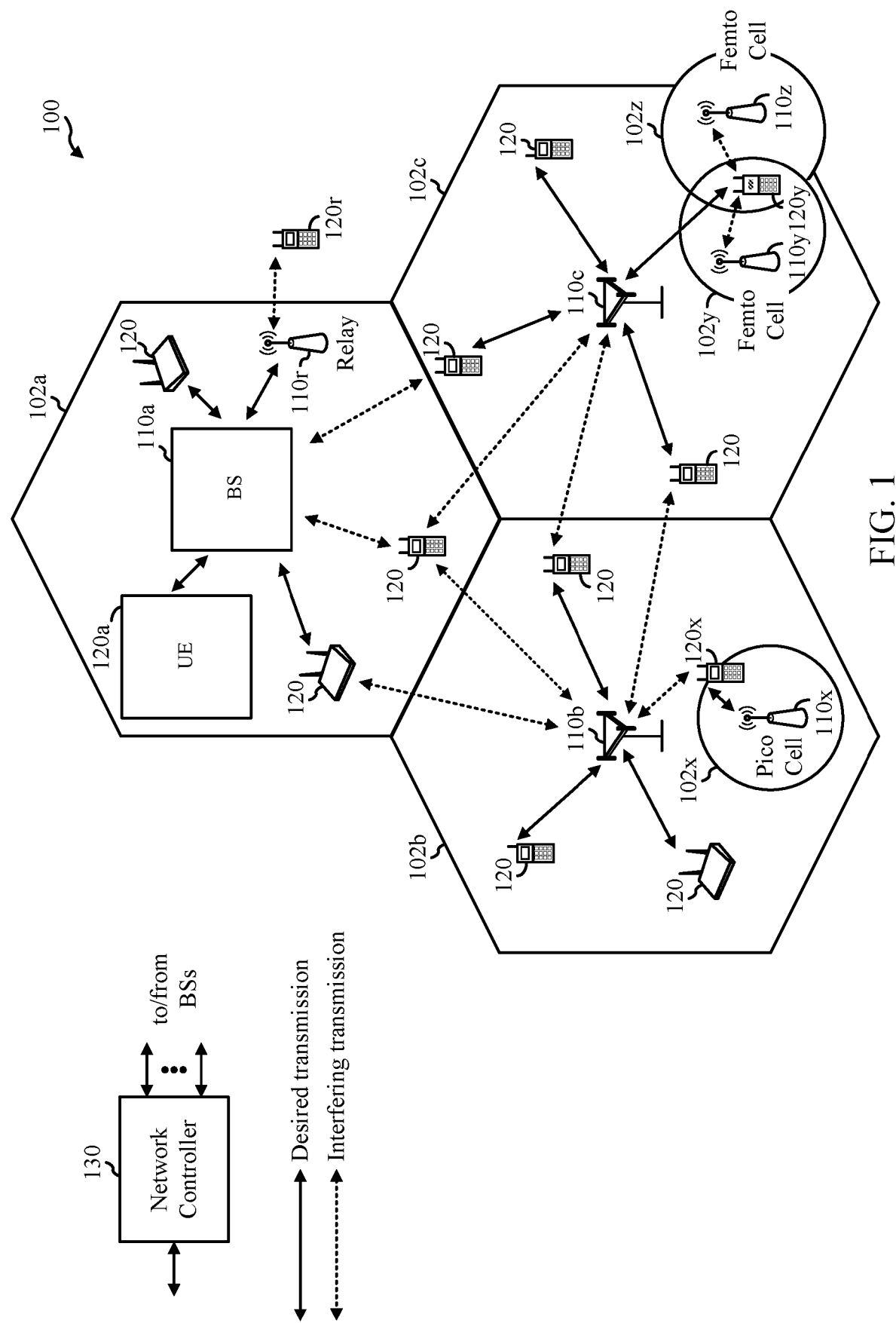
FIG. 1 is a block diagram conceptually illustrating an example telecommunications system, in accordance with certain aspects of the present disclosure.

Aspects of the present disclosure provide techniques for the gradual migration of a child node from a source base station (BS) to a target base station (BS) for an Integrated Access and Backhaul (IAB) network. Although techniques herein are described with respect to an IAB network, such techniques may be applied in other types of networks as well. During an intermediate stage, a target BS may use a source path managed by a source BS for communication with a child node prior to fully migrating the child node to use a target path managed by the target BS. In some aspects, the source BS may provide a traffic mapping configuration to the target BS to facilitate the routing of packets on the source path that are destined to the target BS, as described in more detail herein.

Such techniques for the gradual migration of child nodes described herein may help to spread out the signaling for migration over time (e.g., especially in cases where many child nodes are to be migrated in a short period of time). The intermediate stages of such a gradual procedure may help to support traffic flow without (or at least reduced) packet loss.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Example Wireless Communication Network

FIG. 1 illustrates an example wireless communication network 100 in which aspects of the present disclosure may be performed. For example, wireless communication network 100 may include an Integrated Access and Backhaul (IAB)-node (implemented as a user equipment (UE) 120 or a base station (BS) 110), and a network entity (e.g., a BS 110) configured to perform operations 1200 of FIG. 12 and/or operations 1300 of FIG. 13.

As illustrated in FIG. 1, wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110*a*, 110*b* and 110*c* may be macro BSs for the macro cells 102*a*, 102*b* and 102*c*, respectively. BS 110*x* may be a pico BS for a pico cell 102*x*. BSs 110*y* and 110*z* may be femto BSs for the femto cells 102*y* and 102*z*, respectively. A BS 110 may support one or multiple cells. BSs 110 communicate with UEs 120*a-y* (each also individually referred to herein as UE 120 or collectively as UEs 120) in wireless communication network 100. UEs 120 (e.g., 20*x*, 120*y*, etc.) may be dispersed throughout wireless communication network 100, and each UE 120 may be stationary or mobile.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110.

Network controller 130 may communicate with BSs 110 via a backhaul. BSs 110 may also communicate with one another (e.g., directly or indirectly) via wireless or wireline backhaul.

Figure 2:
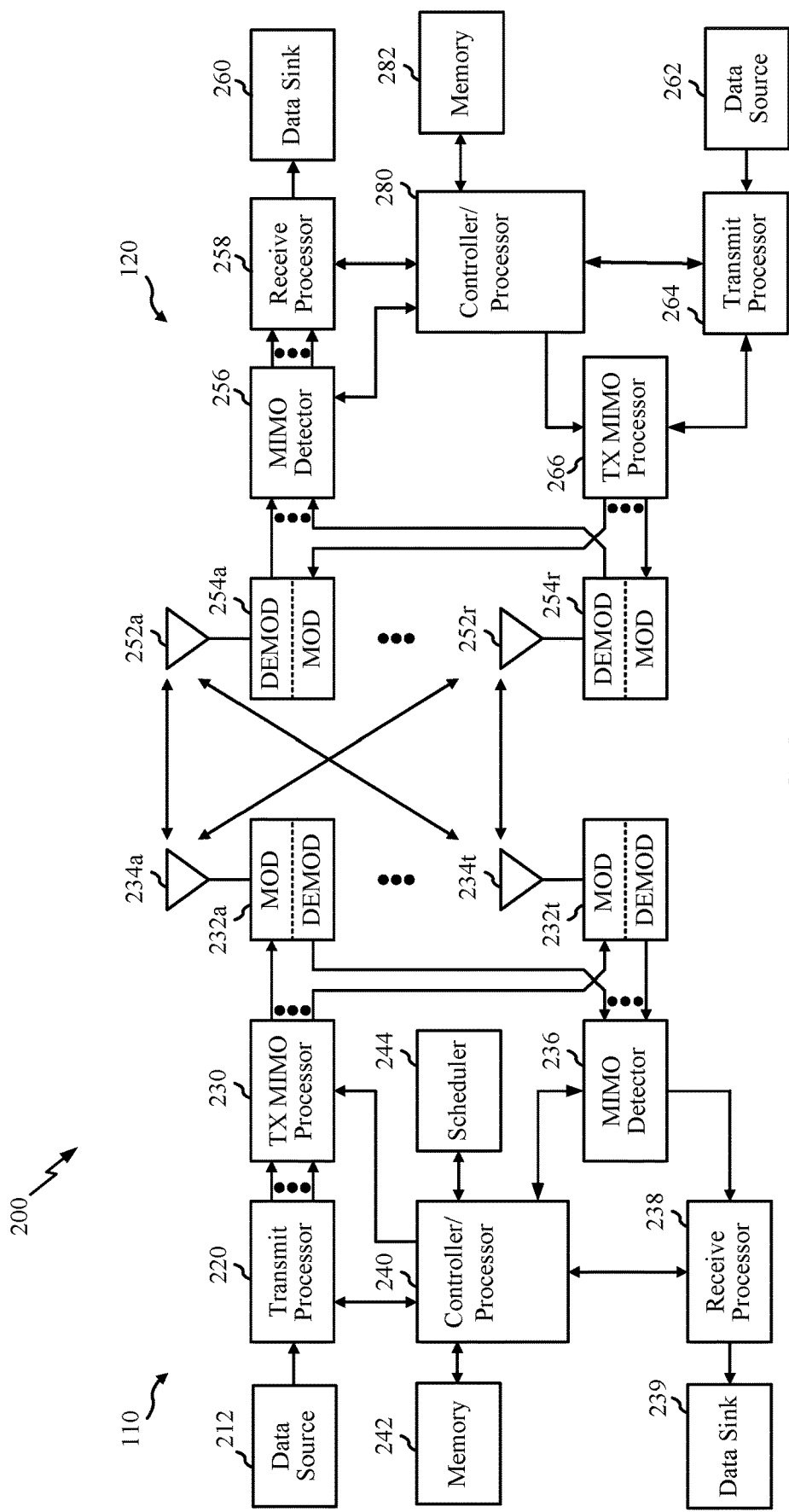
FIG. 2 is a block diagram conceptually illustrating a design of an example a base station (BS) and user equipment (UE), in accordance with certain aspects of the present disclosure.

FIG. 2 illustrates example components 200 of BS 110 and UE 120 (e.g., in wireless communication network 100 of FIG. 1), which may be used to implement aspects of the present disclosure. For example, antennas 252, processors 266, 258, 264, and/or controller/processor 280 of UE 120 and/or antennas 234, processors 220, 230, 238, and/or controller/processor 240 of BS 110 may be used to perform the various techniques and methods described herein.

It should be noted that although FIG. 2 illustrates UE 120 communicating with a BS 110, an IAB-node may similarly communicate with an IAB-donor (e.g., donor-CU), or other network entity, and each may (e.g., respectively) have similar components as discussed with respect to FIG. 2. In other words, an IAB-node may have similar components as UE 120. The BS may be configured to perform operations 1200 of FIG. 12 and/or operations 1300 of FIG. 13, while an IAB-node (or other network entity) may have similar components as UE 120.

At BS 110, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator/demodulator 232 may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink (DL) signal. DL signals from modulators 232*a*-232*t* may be transmitted via the antennas 234*a*-234*t*, respectively.

At UE 120, antennas 252*a*-252*r* may receive DL signals from BS 110 or a parent IAB-node, or a child IAB-node may receive DL signals from a parent IAB-node, and may provide received signals to the demodulators (DEMODs) in transceivers 254*a*-254*r*, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for UE 120 to a data sink 260, and provide decoded control information to controller/processor 280. One or more of antennas 252, demodulators in transceivers 254, MIMO detector 256, receive processor 258, transmit processor 264, TX MIMO processor 266, and/or the like may be components within a transceiver of UE 120.

On the UL, at UE 120 or a child IAB-node, a transmit processor 264 may receive and process data (e.g., for the physical uplink shared channel (PUSCH) or the physical sidelink shared channel (PSSCH)) from a data source 262 and control information (e.g., for the physical uplink control channel (PUCCH) or the physical sidelink control channel (PSCCH)) from controller/processor 280. Transmit processor 264 may also generate reference symbols for a reference signal (RS) (e.g., for the sounding reference signal (SRS)). The symbols from transmit processor 264 may be precoded by a TX MIMO processor 266 if applicable, further processed by the demodulators in transceivers 254*a*-254*r* (e.g., for single-carrier frequency division multiplexing (SC-FDM), etc.), and transmitted to BS 110 or a parent IAB-node.

At BS 110 or a parent IAB-node, the UL signals from UE 120 may be received by antennas 234, processed by modulators/demodulators 232, detected by a MIMO detector 236 if applicable, and further processed by receive processor 238 to obtain decoded data and control information sent by UE 120. Receive processor 238 may provide the decoded data to a data sink 239 and the decoded control information to controller/processor 240. One or more of antennas 234, demodulators 232, TX MIMO processor 230, transmit processor 220, MIMO detector 236, receive processor 238, and/or the like may be components within a transceiver of BS 110.

Controllers/processors 240 and 280 may direct the operation at BS 110 and UE 120, respectively. Controller/processor 240 and/or other processors and modules at BS 110 may perform or direct the execution of processes for the techniques described herein. Controller/processor 280 and/or other processors and modules at UE 120 may perform or direct the execution of processes for the techniques described herein. Memories 242, 282 may store data and program codes for BS 110 and UE 120, respectively. A scheduler 244 may schedule UEs 120 for data transmission on the DL and/or UL.

Figure 3:
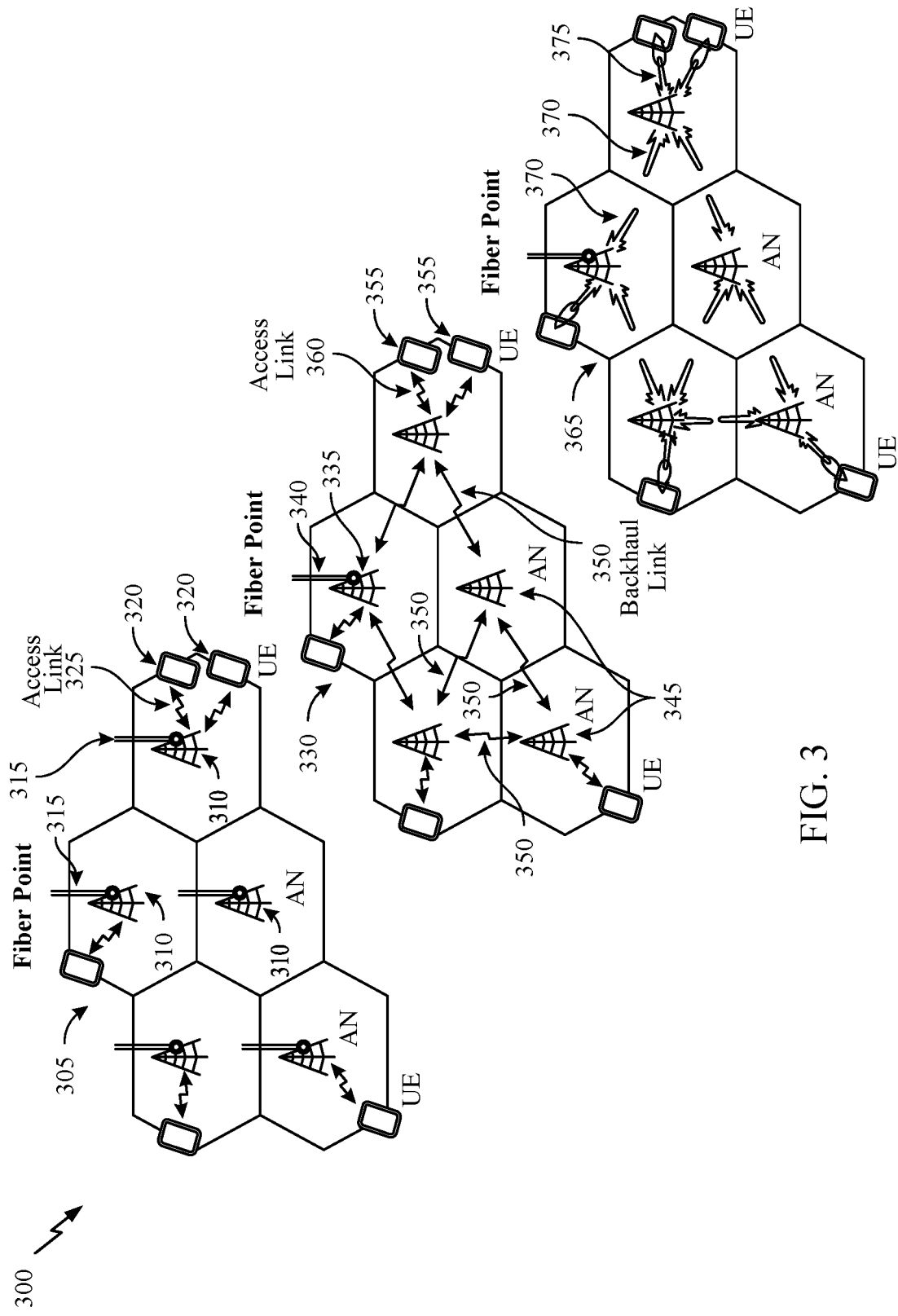
FIG. 3 is a diagram illustrating examples of radio access networks, in accordance with certain aspects of the present disclosure.

FIG. 3 is a diagram 300 illustrating examples of radio access networks (RANs), in accordance with certain aspects of the present disclosure.

As shown by reference number 305, a traditional (for example, 3G, 4G, LTE) RAN may include multiple BSs 310 (for example, access nodes (ANs)), where each BS 310 communicates with a core network via a wired backhaul link 315, such as a fiber connection. A BS 310 may communicate with a UE 320 via an access link 325, which may be a wireless link. In certain aspects, a BS 310 shown in FIG. 3 may correspond to a BS 110 shown in FIG. 1. Similarly, a UE 320 shown in FIG. 3 may correspond to a UE 120 shown in FIG. 1.

As shown by reference number 330, a RAN may include a wireless backhaul network. In some aspects or scenarios, a wireless backhaul network may sometimes be referred to as an IAB network. An IAB network may include multiple BSs, and the BSs may be of differing types or have differing operational characteristics. For example, in certain aspects, an IAB network may have at least one BS that is an anchor BS 335. Anchor BS 335 may communicate with a core network via a wired backhaul link 340, such as a fiber connection. Anchor BS 335 may also be referred to as an IAB donor. An IAB donor is an access node with wireline connection to a core network. An IAB node is an access node that relays traffic from/to anchor BS 335 through one or multiple hops. Anchor BSs 335 can be configured to communicate with other types of base stations or other communication devices (e.g. in a radio network or IAB network).

The IAB network may also include one or more non-anchor BSs 345. Non-anchor BSs 345 may be referred to as relay BSs or IAB nodes. A non-anchor BS 345 may communicate directly with or indirectly with (for example, via one or more other non-anchor BSs 345) anchor BS 335 via one or more backhaul links 350 to form a backhaul path to the core network for carrying backhaul traffic. Backhaul link 350 may be a wireless link. Anchor BS(s) 335 or non-anchor BS(s) 345 may communicate with one or more UEs 355 via access links 360, which may be wireless links for carrying access traffic. In certain aspects, an anchor bS 335 or a non-anchor BS 345 shown in FIG. 3 may correspond to a BS 110 shown in FIG. 1. Similarly, a UE 355 shown in FIG. 3 may correspond to a UE 120 shown in FIG. 1.

As shown by reference number 365, in some aspects, a RAN that includes an IAB network may utilize a variety of spectrum types. For example, an IAB network may utilize a variety of differing radio frequency bands. In a few particular examples and according to certain aspects, millimeter wave (mmW) technology or directional communications can be utilized (for example, beamforming, precoding) for communications between BSs or UEs (for example, between two BSs, between two UEs, or between a BS and a UE). In additional or alternative aspects or examples, wireless backhaul links 370 between BSs may use mmWs to carry information or may be directed toward a target BS using beamforming, precoding. Similarly, the wireless access links 375 between a UE and a BS may use mmWs or may be directed toward a target wireless node (for example, a UE or a BS). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, and spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with BS 110 for that IAB node, and an MT of an IAB node may perform functions described in connection with UE 120 for that IAB node.

Figure 4:
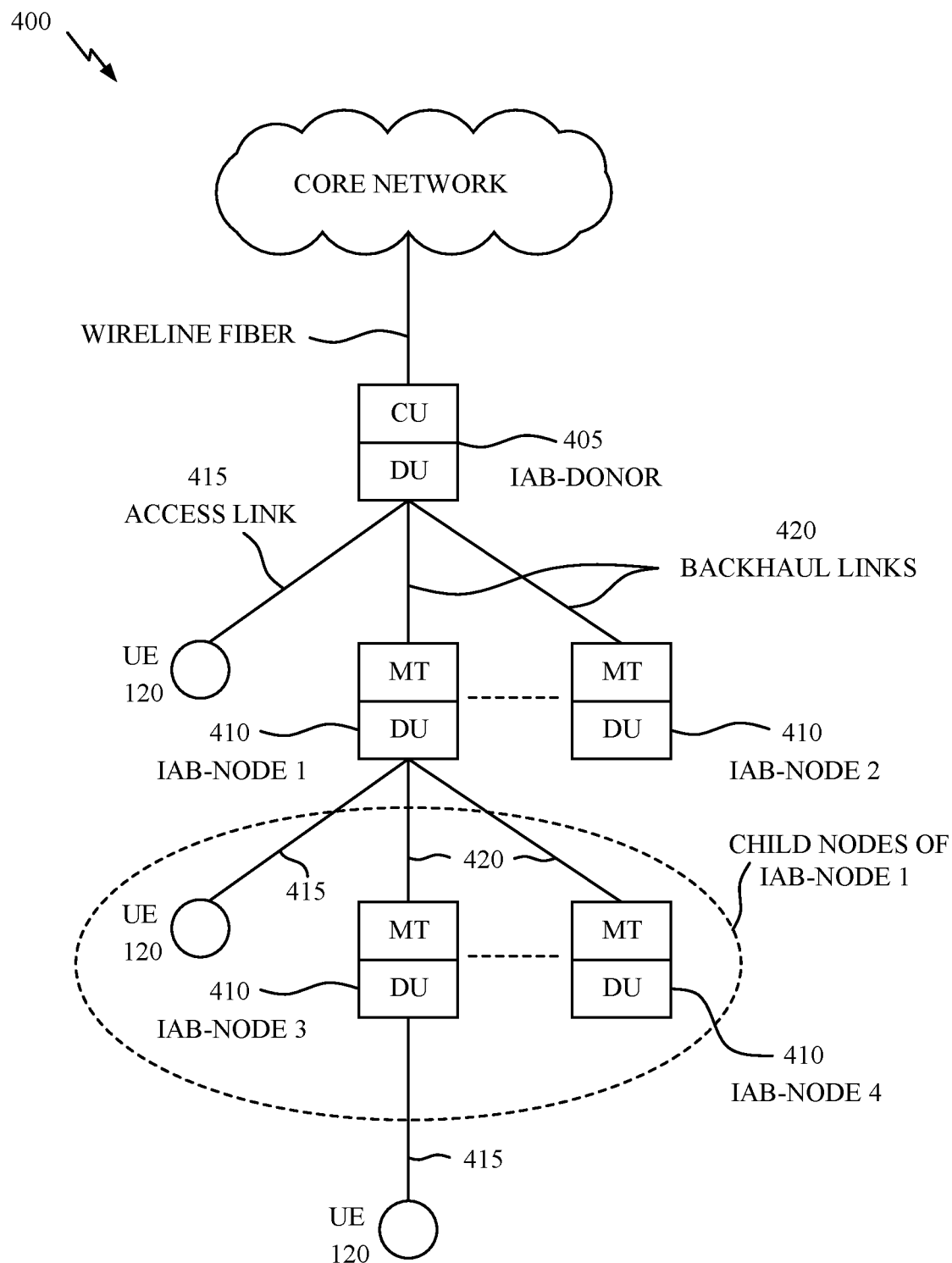
FIG. 4 is a diagram illustrating an example of an integrated access and backhaul (IAB) network architecture in accordance with certain aspects of the present disclosure.

FIG. 4 is a diagram 400 illustrating an example of an IAB network architecture, in accordance with certain aspects of the present disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, IAB donor 405 may connect to one or more devices of the core network that provide a core access and mobility management function (AMF). In certain aspects, an IAB donor 405 may include a BS 110, such as an anchor BS, as described above in connection with FIG. 3. As shown, IAB donor 405 may include a CU, which may perform access note controller (ANC) functions or AMF functions. The CU may configure a DU of IAB donor 405 or may configure one or more IAB nodes 410 (for example, an MT or a DU of IAB node 410) that connect to the core network via IAB donor 405. Thus, a CU of IAB donor 405 may control or configure the entire IAB network that connects to the core network via IAB donor 405, such as by using control messages or configuration messages (for example, a radio resource control (RRC) configuration message, an F1 application protocol (FLAP) message).

As described above, the IAB network may include IAB nodes 410 (shown as IAB nodes 1 through 4) that connect to the core network via IAB donor 405. As shown, IAB node 410 may include an MT and may include a DU. The MT of IAB node 410 (for example, a child node) may be controlled or scheduled by another IAB node 410 (for example, a parent node) or by IAB donor 405. The DU of IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In certain aspects, IAB donor 405 may include a DU and not an MT. That is, IAB donor 405 may configure, control, or schedule communications of IAB nodes 410 or UEs 120. A UE 120 may include only an MT, and not a DU. That is, communications of a UE 120 may be controlled or scheduled by IAB donor 405 or IAB node 410 (for example, a parent node of UE 120).

According to certain aspects, certain nodes may be configured to participate in control/scheduling processes. For example in certain aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between UE 120 and IAB donor 405, or between UE 120 and IAB node 410, may be referred to as an access link 415. Each access link 415 may be a wireless access link that provides UE 120 with radio access to a core network via IAB donor 405, and potentially via one or more IAB nodes 410.

As further shown in FIG. 4, a link between IAB donor 405 and IAB node 410, or between two IAB nodes 410, may be referred to as a backhaul link 420. Each backhaul link 420 may be a wireless backhaul link that provides IAB node 410 with radio access to a core network via the IAB donor 405, and potentially via one or more other intermediate IAB nodes 410.

In certain aspects, a backhaul link 420 may be a primary backhaul link or a secondary backhaul link (for example, a backup backhaul link). In certain aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor BSs) are stationary (that is, non-moving). Next generation (5G) wireless networks have stated objectives to provide ultra-high data rate and support a wide scope of application scenarios. IAB systems have been studied in 3GPP as one possible solution to help support these objectives.

As noted above, in an IAB system, a wireless backhaul solution is adopted to connect cells (e.g., IAB-nodes) to the core network (which uses a wired backhaul). Some attractive characteristics of an IAB system are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions and a particular architecture deployed may depend on what layers of a protocol stack are implemented in the intermediate nodes e.g., (IAB-nodes), for example, L2 relays may implement physical (PHY)/medium access control (MAC)/radio link control (RLC) layers.

As described herein, an IAB donor may be an enhanced gNB node with functions to control an IAB network. A CU may refer to the central entity that controls the entire IAB network through configuration. The CU holds RRC/packet data convergence protocol (PDCP) layer functions. A DU may be a scheduling node that schedules child nodes of this IAB-donor. The DU holds RLC/MAC/PHY layer functions.

An IAB-node is an L2 relay node consisting of MT and DU functions, as described herein. MT is a scheduled node similar to a UE scheduled by its parent IAB-node or IAB-donor. A DU is a scheduling node that schedules child nodes of this IAB-node.

Example Handover Techniques in an Integrated Access and Backhaul (IAB) Network

Figure 5A:
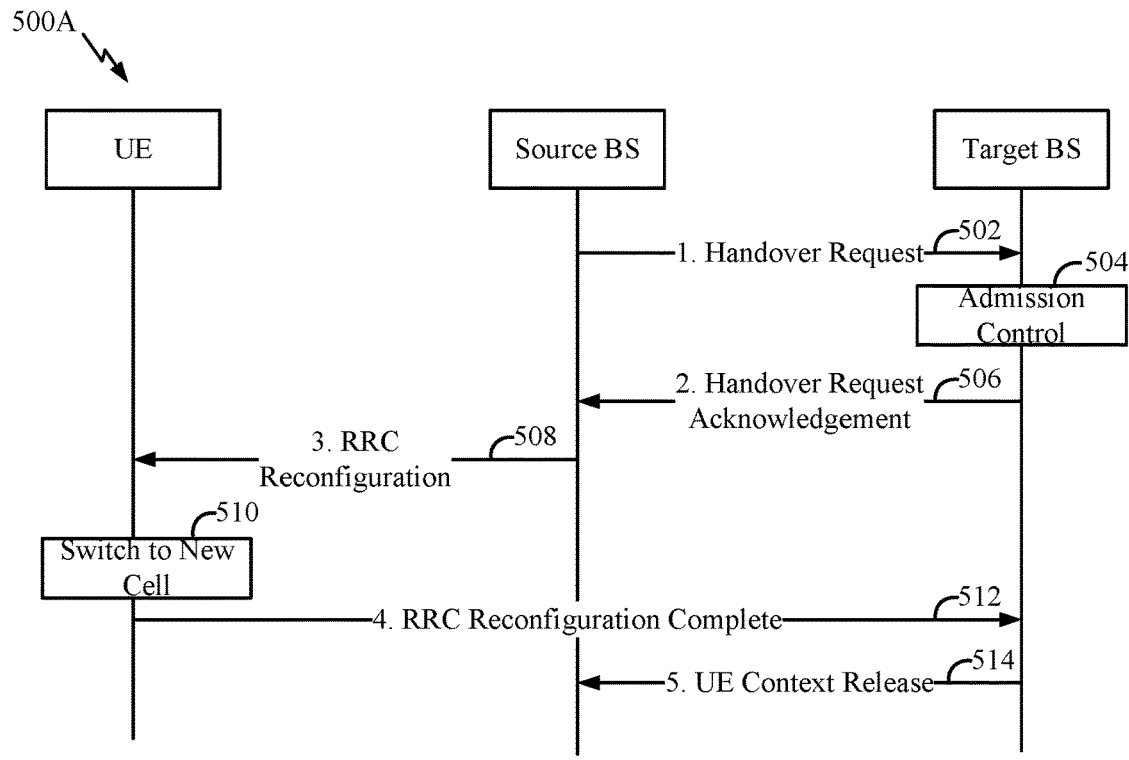
FIGS. 5A, 5B, 5C illustrate example operations for handover of a UE from a source BS to a target BS, in accordance with certain aspects of the present disclosure.

FIG. 5A illustrates example operations 500A for handover of a UE from a source base station (BS) to a target base station (BS), in accordance with certain aspects of the present disclosure. Although not shown, there may be some trigger for handover from the source BS to the target BS, such as a measurement report from the UE. As illustrated, the source BS may initiate handover by sending a handover request 502 (e.g., via an Xn interface) to the target BS.

The target bS may perform admission control operations at block 504. For admission control, the target BS may determine whether there are sufficient resources to admit the UE. If so, the target BS may then provide a radio resource control (RRC) configuration to the source BS as part of a handover request acknowledgement 506 (e.g., including an RRC reconfiguration message).

The source BS may then provide the RRC configuration message 508 to the UE by forwarding the RRC reconfiguration message received in the handover request acknowledgement. The UE may then, at block 510, switch the RRC connection to the target BS and reply with an RRC reconfiguration complete message 512 to the target BS, as illustrated. The target BS may then send a UE context release message 514 to the source BS to inform the source BS about the success of the handover, allowing the source BS to release the resources reserved for the UE.

Figure 5B:
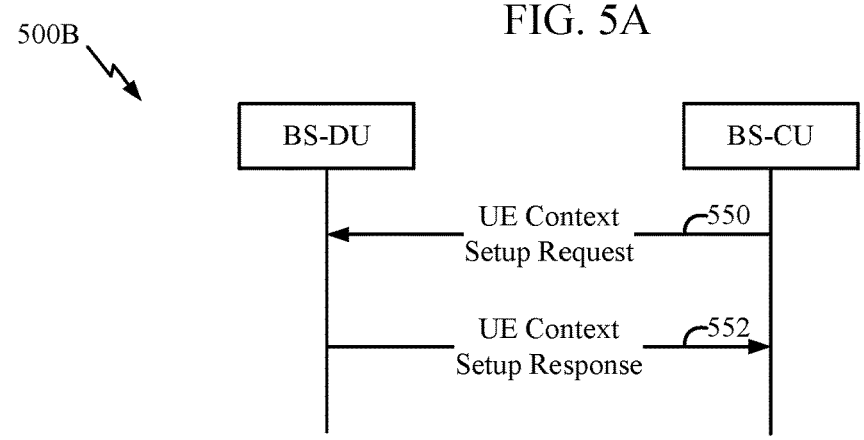
Figure 5C:
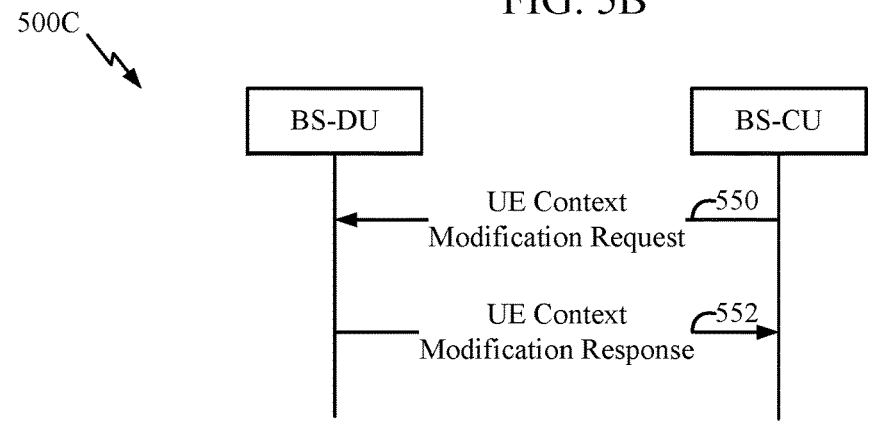

FIGS. 5B and 5C illustrate example operations 500B and 500C, respectively, for performing admission control operations at a target BS, in accordance with certain aspects of the present disclosure. The CU may receive the handover request from the source BS. The CU may then check with the DU to see if there are sufficient resources to serve the UE. To do so, either a context setup procedure may be used, as illustrated in FIG. 5B, or a context modification procedure may be used, as illustrated in FIG. 5C. The context setup procedure may be used for an initial UE context setup with the DU, and any subsequent modification to the context for the UE may be performed via the context modification procedure.

The context setup or modification request may be used to determine whether the DU is able to provide a particular service for the UE. In other words, the purpose of the UE context setup/modification procedure is to establish/modify the UE context including, among others, a signalling radio bearer (SRB), a data radio bearer (DRB), a backhaul (BH) radio link control (RLC) channel, and/or a sidelink (SL) DRB configuration (e.g., for SL communication between UEs). For example, referring to FIG. 4, even though UE 120 may be served by the DU of the IAB-node 3, the CU of IAB donor 405 may setup a BH RLC channel for the backhaul link 420 that facilitates communication for UE 120. In some implementations, the UE context setup/modification procedure may use UE-associated signalling.

As illustrated in FIGS. 5B and 5C, the CU may send a UE context setup/modification request 550 to the DU. The DU may then report back to the CU indicating whether the DU is capable of providing services for the UE via a UE context setup/modification response 552. For example, the DU may report to the CU a list of DRBs/SRBs/SL DRBs successfully established/modified, a list of DRBs/SRB s/SL DRBs that failed to be established/modified, a list of BH RLC CHs successfully established/modified, and a list of BH RLC CHs that failed to be established/modified. In some scenarios, the DU may indicate that the UE context setup/modification has failed.

Figure 6:
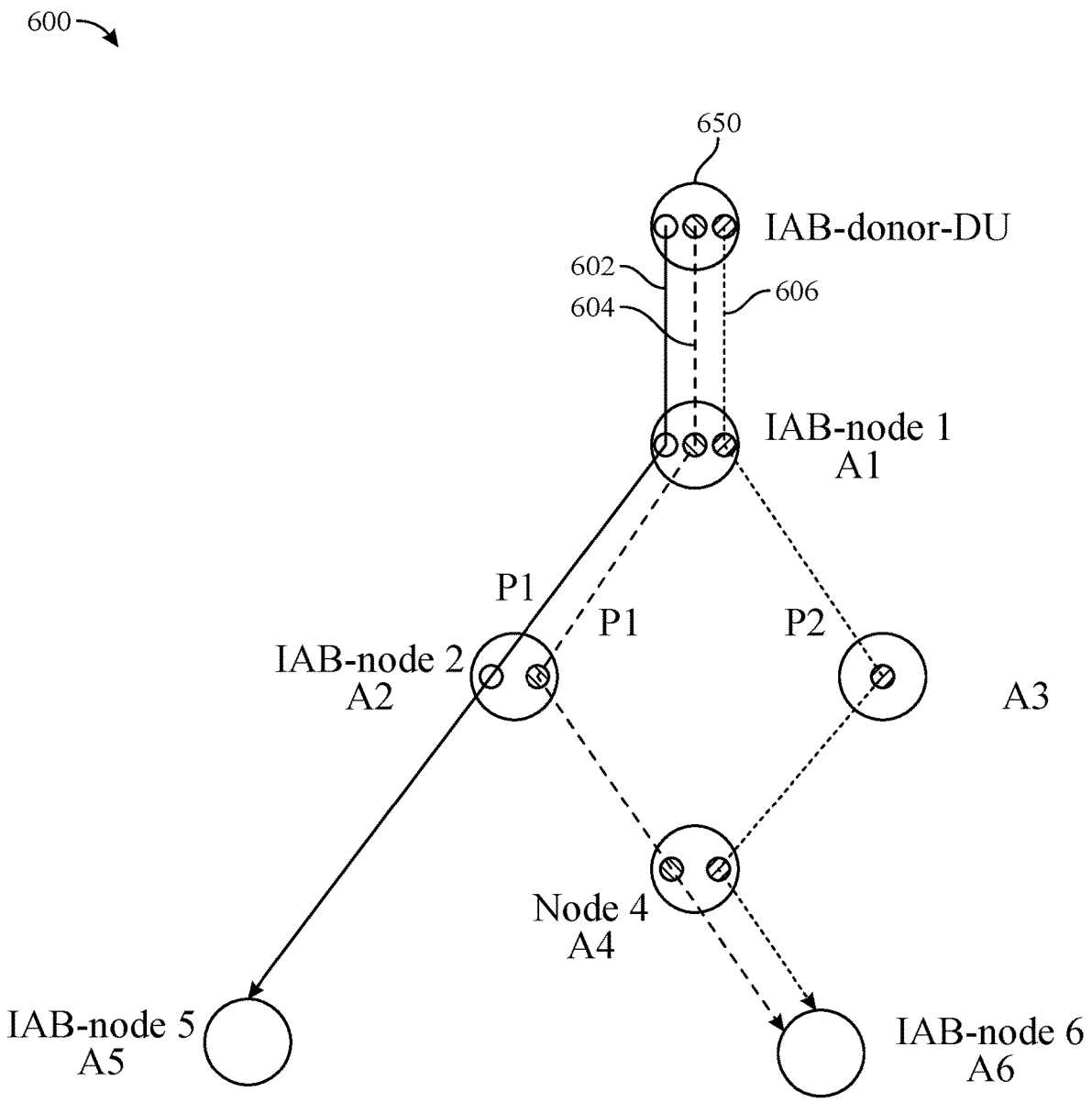
FIG. 6 illustrates example techniques for routing across a backhaul network for a backhaul adaptation protocol (BAP) layer, in accordance with certain aspects of the present disclosure.

Example Bottom-Up Migration Techniques in an Integrated Access and Backhaul (IAB) Network FIG. 6 illustrates example techniques 600 for routing across a backhaul network for a backhaul adaptation protocol (BAP) layer. The BAP layer is used for routing and quality of service (QoS) support. In other words, the BAP layer may support routing across a wireless backhaul (BH) and mapping of traffic to a BH radio link control (RLC) channel (e.g., for QoS). The BAP layer may use various identifiers, such as a BAP address, a BAP path identifier (ID), and/or a BAP routing ID which is a combination of the BAP address and the BAP path ID. In other words, a BAP header of a packet may carry the BAP routing ID which may include a BAP address plus a BAP path ID. The BAP address designates the destination node of the packet, while the BAP path ID differentiates multiple routes to the same destination node. For instance, the BAP address may indicate a user equipment's (UE's) access Integrated Access and Backhaul (IAB)-node (e.g., IAB-node 5 (A5) for path P1) in the downstream direction, or the IAB-donor-distributed unit (DU) (e.g., IAB-donor-DU 650) in the upstream direction.

For BAP routing, a BAP header with a BAP routing ID may be added when a packet enters the BAP layer from upper layers. On intermediate hops, a packet may be routed (e.g., by IAB-node 1 (A1)) to the next hop based on the BAP routing ID in the BAP header and routing configuration. The routing configuration may be configured by the IAB-donor-central unit (CU).

As illustrated in FIG. 6, there may be multiple routes (e.g., routes 602, 604, 606) from an IAB-donor-DU to various IAB-nodes. Route 602 may have a BAP routing ID that is equal to a BAP address associated with IAB-node 5 (A5) plus the BAP path P1, route 604 may have a BAP routing ID that is equal to the BAP address associated IAB-node 6 (A6) plus the BAP path P1, and route 606 may have a BAP routing ID that is equal to the BAP address associated IAB-node 6 plus the BAP path P2. While both routes 604, 606 may have the same destination at IAB-node 6, different paths (e.g., paths P1 and P2) may be used due to QoS requirements.

For example, where a packet is to be sent from IAB-donor-DU to IAB-node 6 on path P1, the identifier for IAB-node 6 and the ID associated with path P1 may be used. In some cases, the same packet may also be sent to IAB-node 6 on path P2. Therefore, the routing ID may be used to distinguish which path is to be used for the packet being sent to IAB-node 6. Each IAB-node may have a routing table that maps a BAP routing ID to an egress link. For instance, IAB-node 2 (A2) may receive a packet from IAB-node 1 and check the routing ID in a header of the packet. The routing ID may refer to path P1 to IAB-node 6 and thus determine that the egress link for routing the packet to IAB-node 4 should be selected.

At the endpoints (e.g., at IAB-donor-DU or IAB-node 6), a mapping may be implemented between upper layer traffic and the BAP routing ID. For example, at IAB-node 6, a mapping may exist between the upper layer traffic (e.g., a radio bearer) of a UE served by IAB-node 6 (e.g., an RB) and the routing ID.

Figure 7:
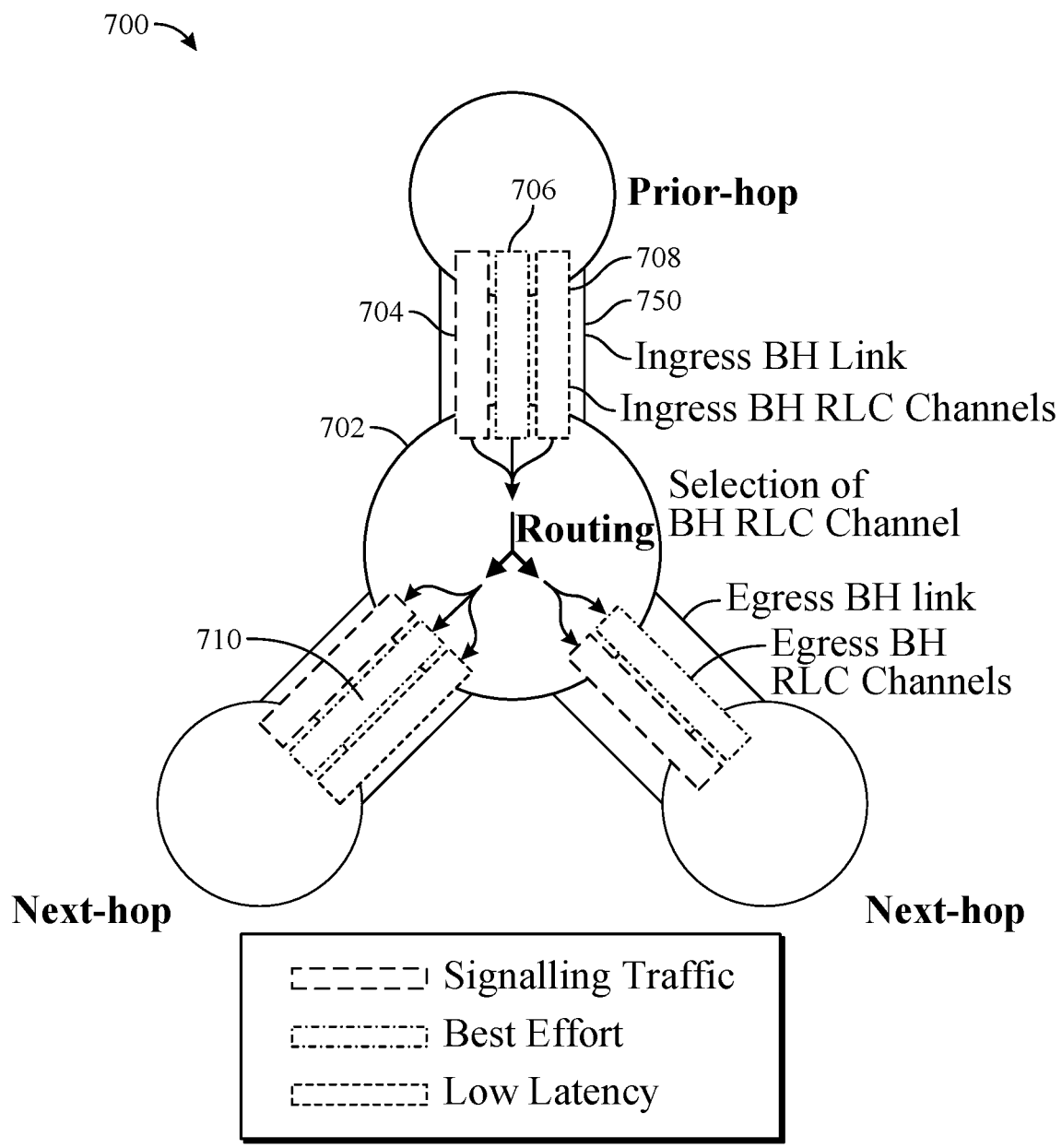
FIG. 7 illustrates example techniques for traffic routing for quality of service (QoS), in accordance with certain aspects of the present disclosure.

FIG. 7 illustrates example techniques 700 for traffic routing for QoS, in accordance with certain aspects of the present disclosure. In certain aspects, multiple BH RLC CHs may be used to allow an IAB-node to distinguish between packets that may have different QoS requirements. Access RLC channels may be implemented between a UE and a DU to carry Packet Data Convergence Protocol (PDCP) packets for radio resource control (RRC) or data radio bearer (DRB), and between a mobile terminal component (MT) and DU to carry PDCP packets for RRC or DRB. BH RLC channels (CHs) may be implemented between an MT and a DU to carry BAP packets for backhauling of access traffic.

QoS and traffic prioritization on BH may be enforced through a multitude of BH RLC CHs (e.g., BH RLC CHs 704, 706, 708) per BH link (e.g., BH link 750). For example, an IAB-node 702 (e.g., corresponding to IAB-node 1 of FIG. 6) may be configured with ingress BH RLC CHs 704, 706, 708 configured for signaling traffic, best-effort traffic, and low latency traffic, respectively, as illustrated. Depending on which ingress BH RLC CH a packet is received on, IAB-node 702 may determine which egress BH RLC CH is to be used to send the packet. In other words, a packet associated with low latency traffic may be received on BH RLC CH 706, and provided to corresponding BH RLC CH 710 in order to route a packet received from a prior-hop to the next hop (e.g., corresponding to IAB-node 2 of FIG. 6).

Upper layer traffic may be mapped to BH RLC channels at various granularities, such as F1-user place (U)/X2-U for general packet radio service (GPRS) tunneling protocol (GTP)-U tunnel, F1-control plane (C) for non-UE-associated versus UE-associated F1AP, and non-F1 for type-1/2/3 (e.g. for different classes of Operations, Administration and Maintenance (OAM) traffic). Mapping of traffic may occur at a traffic entry point to the BAP layer, (e.g., access IAB-node and IAB-donor-DU). At intermediate hops, egress RLC-channels are mapped from ingress RLC-channels.

Figure 8:
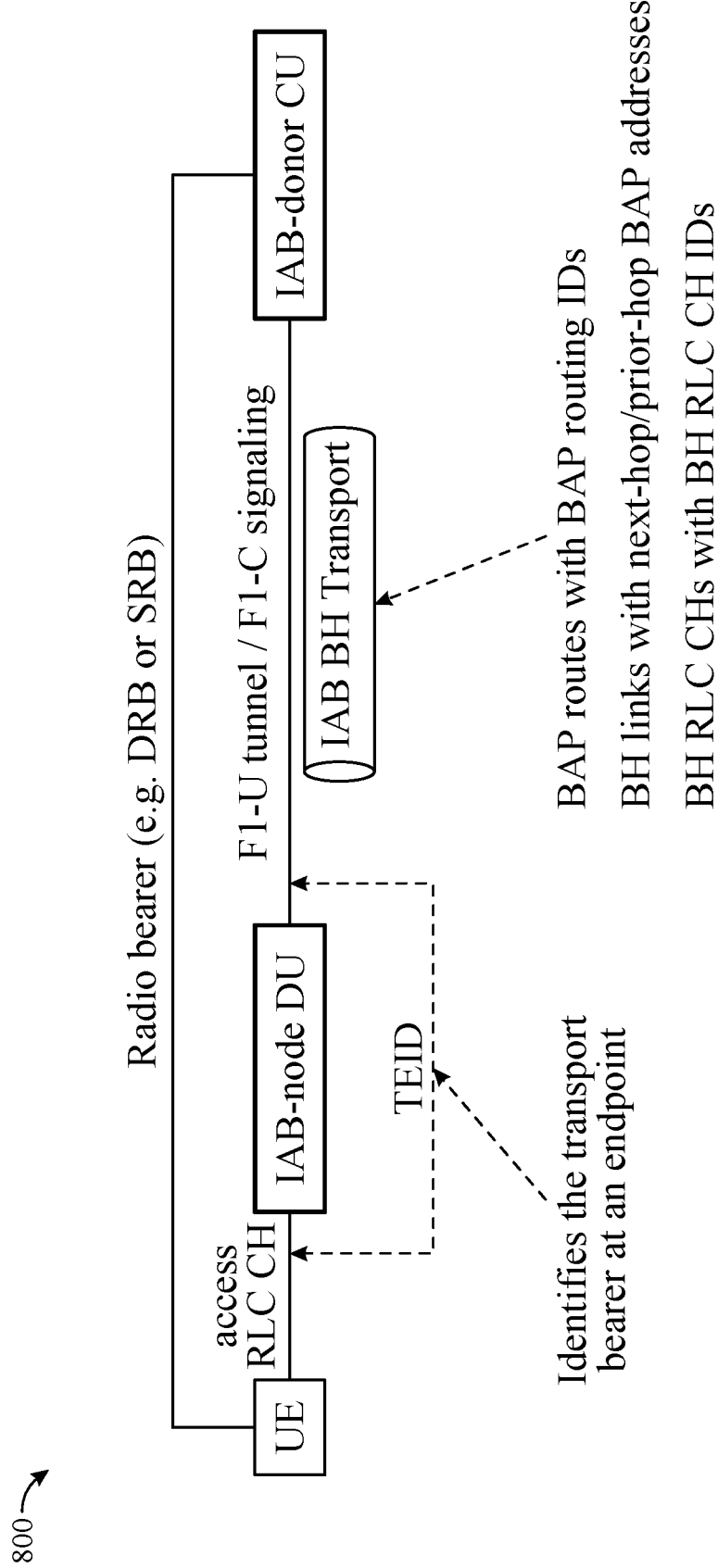
FIG. 8 illustrates an example protocol having channels for communication of traffic between a UE and an IAB-donor central unit (CU), in accordance with certain aspects of the present disclosure.

FIG. 8 illustrates an example protocol 800 having channels for communication of traffic between a UE and an IAB-donor CU, in accordance with certain aspects of the present disclosure. The UE may be served by the IAB-donor CU, but served on a physical link by an IAB-node DU, as illustrated.

A radio bearer is established and refers to the connection between a UE and the IAB-donor CU, as illustrated. The traffic between the UE and the IAB-donor CU is facilitated by the access RLC CH link between the UE and the IAB-node DU, as well as the link (e.g., F1 interface) between the IAB-node DU and the IAB-donor CU. Thus, the radio bearer may be mapped to the access RLC channel for the access RLC channel to carry the radio bearer. For the BH between the IAB-node DU and the IAB-donor CU, F1 signaling on an IAB BH transport may be used to transport the traffic (e.g., F1-U for DRB, and F1-C for a signalling radio bearer (SRB)). The connection between the IAB-node DU and the IAB-donor CU may be a wired link and/or a wireless link. The IAB BH transport may include the BAP layer configurations described with respect to FIGS. 6 and 7. For example, the IAB BH transport may be implemented using BAP routes with BAP routing IDs, BH links with next-hop and prior-hop BAP addresses, and BH RLC CHs with BH RLC CH IDs.

Figure 9:
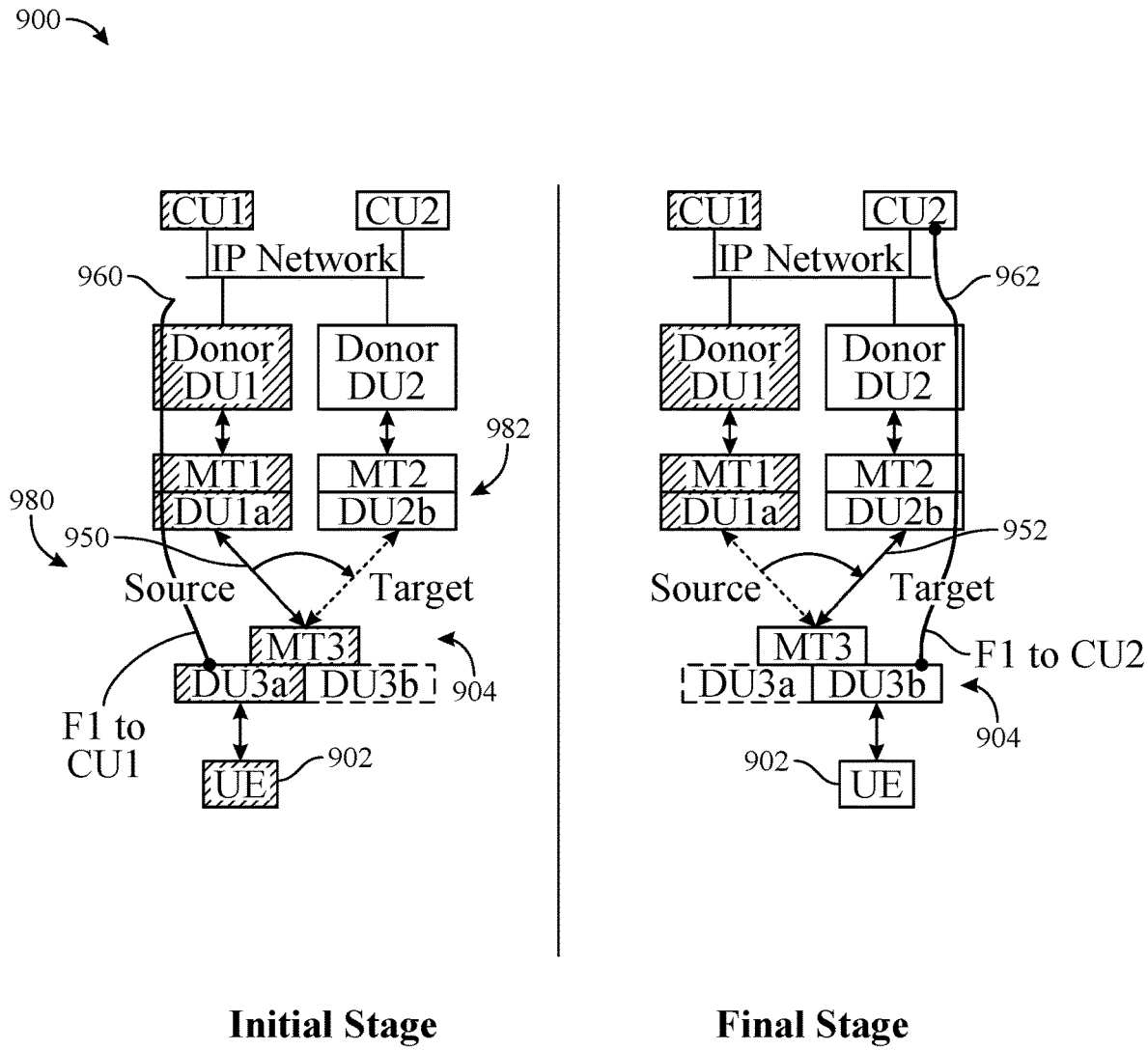
FIG. 9 illustrates an example technique for migration of an IAB-node and a child UE, in accordance with certain aspects of the present disclosure.

FIG. 9 illustrates an example technique 900 for migration of IAB-node 904 (also referred to herein as "IAB-node 3") and child UE 902 from IAB-donor-CU1 to IAB-donor-CU2, in accordance with certain aspects of the present disclosure. As illustrated in FIG. 9, IAB-node 904 may include an IAB-MT (hereinafter referred to as "MT3") and an IAB-DU. In certain aspects, the IAB-DU of the IAB-node 904 may be implemented using multiple logical IAB-DUs, each associated with a different CU. For example, a first logical IAB-DU (hereinafter referred to as "DU3a") of IAB-node 904 may be associated with and mange communications for a first donor CU (hereinafter referred to as "CU1"), and a second logic IAB-DU (hereinafter referred to as "DU3b") may be associated with and manage communications for a second donor CU (hereinafter referred to as "CU2"). As illustrated, MT3 may be connected to CU1 through a parent IAB-node 980 having a DU (hereinafter referred to as "parent DU1a") and connected to CU2 through another parent IAB-node 982 having a DU (hereinafter referred to as "parent DU2b"). DU1a and DU2b are connected to CU1 and CU2 through donor DU1 and donor DU2, respectively.

During an initial stage, MT3 and UE 902 are connected to CU1. F1 traffic (e.g., F1-U traffic) for UE 902 flows on source path 950 (e.g., on F1 signaling between DU3a and CU1) such that packets are routed using route 960 between UE 902 and CU1, as illustrated. In the final stage, MT3 and UE 902 are connected to CU2. F1 traffic for UE 902 flows on target path 952 (e.g., on F1 signaling between DU3b and CU2) such that packets are routed using route 962 between UE 902 and CU2, as illustrated.

The migration from CU1 to CU2 may cause a large amount of signaling in a short period of time where many UEs and/or descendent nodes are migrated. For example, MT3 may have to perform random access channel (RACH) synchronization, and every UE may have to perform RACH operations. Certain aspects of the present disclosure are directed to techniques for a gradual migration of UEs and/or descendant nodes between CUs such that the signaling used for migration is spread out in time, reducing packet loss.

Figure 10:
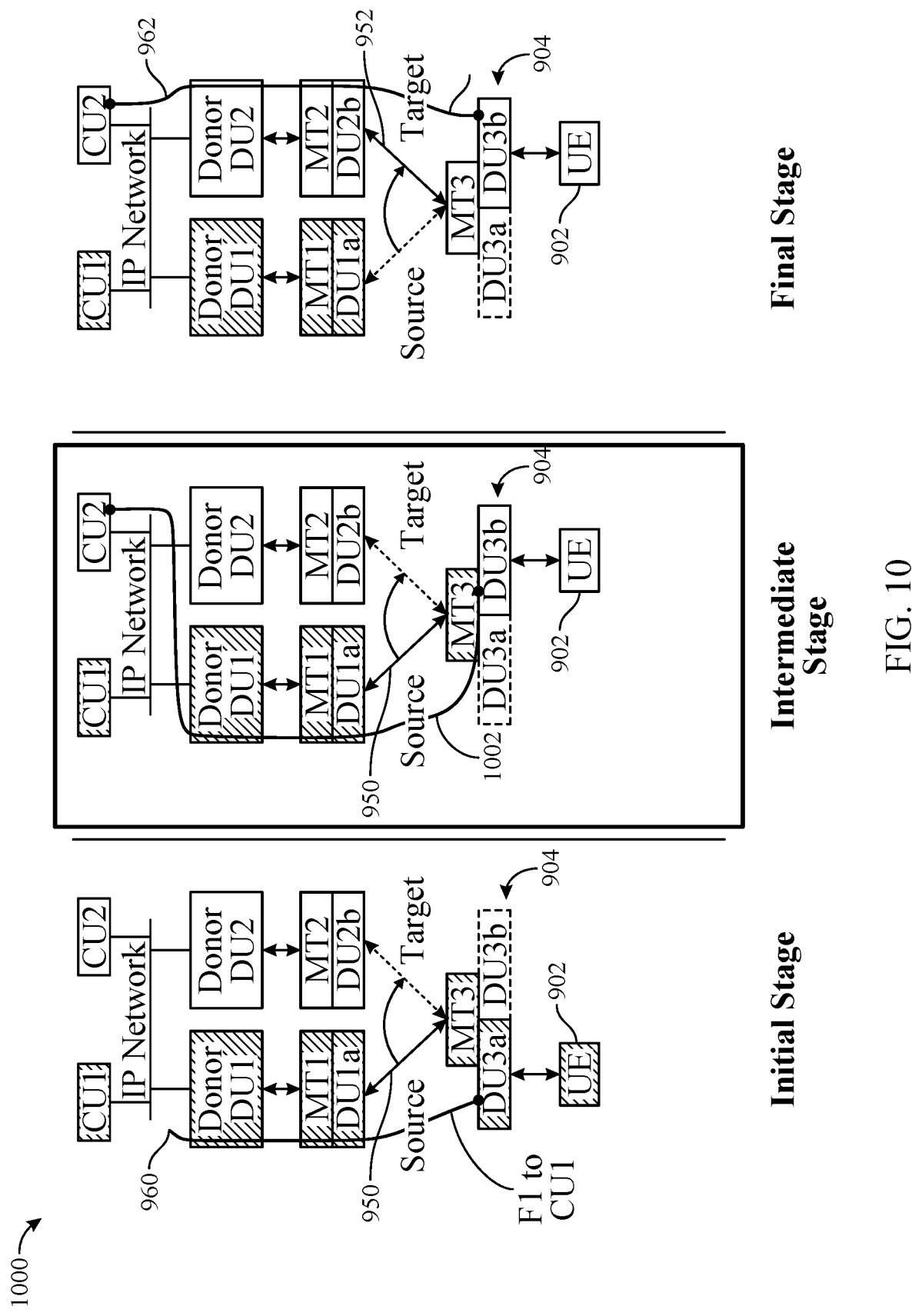
FIG. 10 illustrates example techniques for the gradual migration of a child node, in accordance with certain aspects of the present disclosure.

FIG. 10 illustrates example techniques 1000 for the gradual migration of UEs and descendent-node IAB-MTs, in accordance with certain aspects of the present disclosure. In other words, the migration may be implemented using an intermediate stage during which some UEs and descendent IAB-MTs are connected to different IAB-donor CUs than the migrating IAB-MT. For example, MT3 may be connected to CU1 through source path 950, while a connection between UE 902 to IAB-donor-CU2 is facilitated. For instance, F1 traffic for UE 902 may flow on a source path 950 between CU2 and DU3*b* of IAB-node 904 during the intermediate stage. In other words, source path 950 may be used for communicating traffic to the IP network, and the IP network may facilitate routing of the traffic from the source path to CU2 such that packets are routed between UE 902 and CU2 using route 1002 (as shown in the immediate stage of FIG. 10). During the final stage, the traffic may be redirected from source path 950 to target path 952 for routing of packets using route 962. This technique for the gradual migration of UEs and/or descendant node(s) helps to spread out the signaling for migration in time. The intermediate stages of such a gradual procedure may support traffic flow without (or at least reduced) packet loss.

Since source path 950 is terminated at CU1, CU1 knows how to map the F1 traffic on source path 950. In other words, the mapping of traffic on various paths as described with respect to FIGS. 6 and 7 may be managed by CU1. However, during the intermediate stage, the traffic for CU2 is carried on the source path 950 that is configured by CU1. For example, CU2 may not know the BAP routing ID to be used to map the F1 signaling. Certain aspects of the present disclosure are directed to techniques for CU2 to map UE traffic onto a BAP route (e.g., between IAB-node 904 and donor-DU1) if CU1 configures the source path BH transport and CU2 is unaware of the topology of the source path BH transport. For example, CU1 may provide a traffic mapping configuration to CU2, allowing CU2 to configure IAB-node 904 to route the traffic to CU2 on the source path using the appropriate BAP routing ID.

Figure 11:
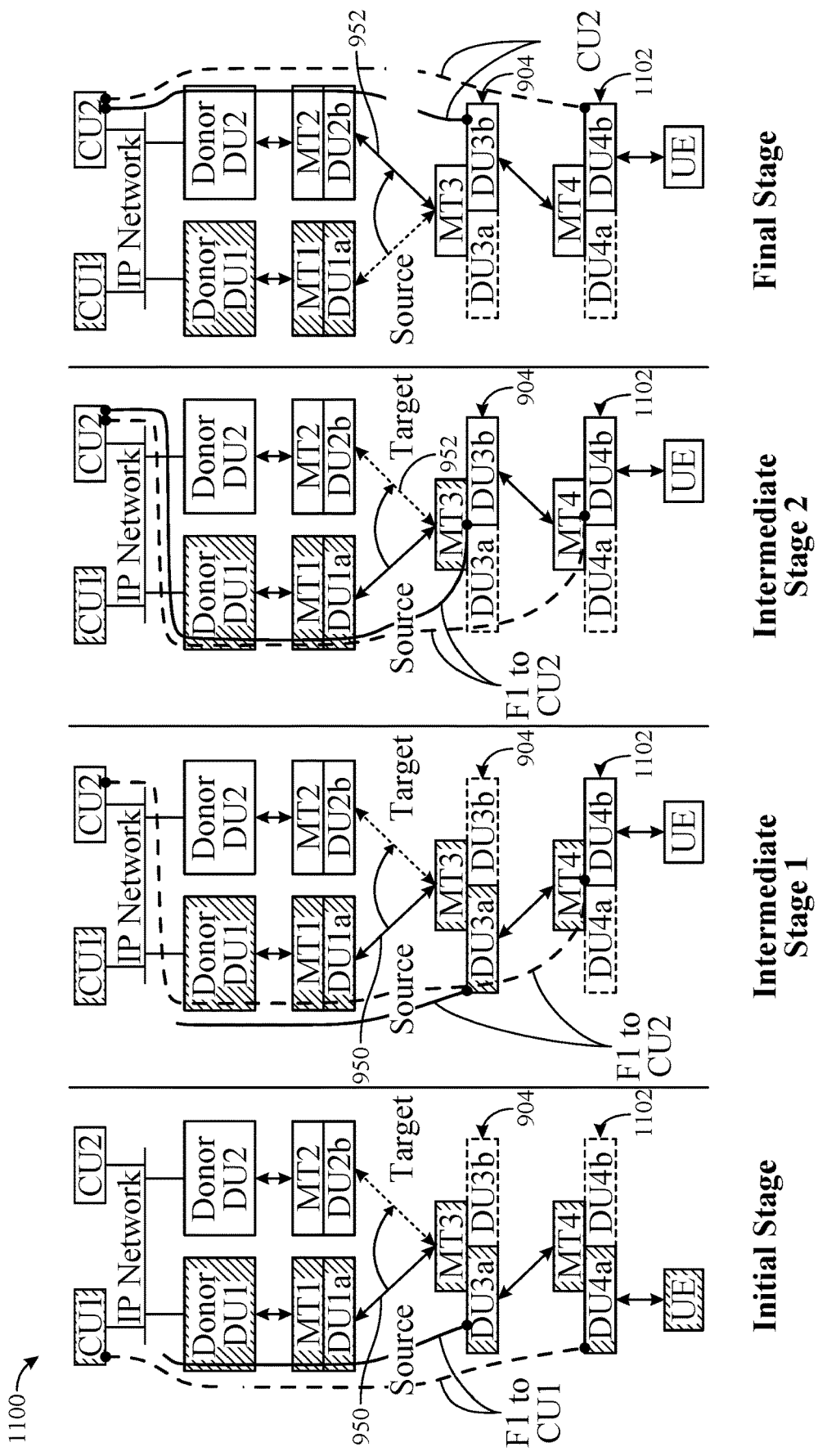
FIG. 11 illustrates example techniques for the gradual migration of a child node implemented with multiple hops, in accordance with certain aspects of the present disclosure.

FIG. 11 illustrates example techniques 1100 for the gradual migration of UEs and descendent-node IAB-MTs implemented with multiple hops, in accordance with certain aspects of the present disclosure. As illustrated in FIG. 11, IAB-node 1102 (also referred to herein as "IAB-node 4) may be the child node of IAB-node 3, and the UE may be the child node of IAB-node 4. During intermediate stage 1, the connection for F1 signaling for IAB-node may be migrated from CU1 to CU2, yet still carried on a source path 950. During intermediate stage 2, the connection for F1 signaling for IAB-node 904 may be migrated from CU1 to CU2, yet still carried on source path 950. During the final stage, the connections between both IAB-node 904 and IAB-node 1102 to CU2 may be migrated from source path 950 to target path 952, as illustrated. For example, during the intermediate stage 1, IAB-node 1102 may migrate from using logic IAB-DU4*a* to logical IAB-DU4*b* for communication with CU2 on source path, and during intermediate stage 2, IAB-node 904 may migrate from using logic IAB-DU3*a* to logical IAB-DU3*b* for communication with CU2 on source path.

Certain aspects of the present disclosure are directed to techniques for allowing CU2 to map UE traffic onto a source BAP route between the IAB-node 1102 and donor-DU1 during an intermediate stage 1. Moreover, certain aspects provide techniques for CU2 to map access traffic of IAB-MT4 of IAB-node 1102 onto a source BAP route between IAB-node 904 and donor-DU1, and CU2 to map the BH traffic between IAB-MT4 and IAB-DU3*b* and the source BAP route between IAB-node 904 and donor-DU1.

Figure 12:
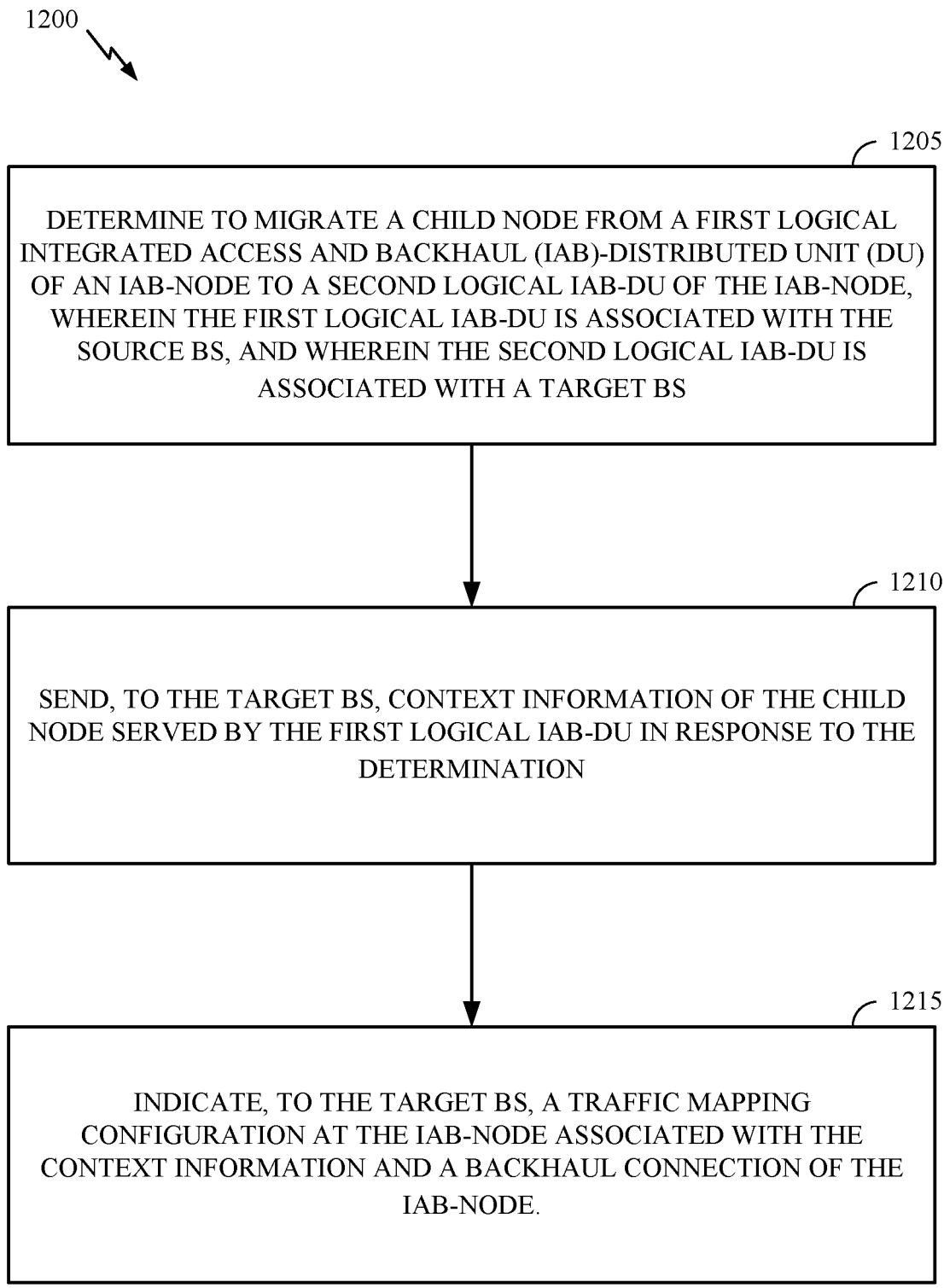
FIG. 12 is a flow diagram illustrating example operations for wireless communication by a source BS, in accordance with certain aspects of the present disclosure.

FIG. 12 is a flow diagram illustrating example operations 1200 for wireless communication by a source BS, in accordance with certain aspects of the present disclosure. Operations 1200 may be performed, for example, by a first IAB-donor-CU (e.g., CU1 described with respect to FIGS. 10-11).

Operations 1200 may be implemented as software components that are executed and run on one or more processors (e.g., controller/processor 240 of FIG. 2). Further, the transmission and reception of signals by the source BS in operations 1200 may be enabled, for example, by one or more antennas (e.g., antennas 234 of FIG. 2). In certain aspects, the transmission and/or reception of signals by source BS may be implemented via a bus interface of one or more processors (e.g., transmit (TX) multiple-input multiple-output (MIMO) processor 230, transmit processor 220, receive processor 238, controller/processor 240, and scheduler 244) obtaining and/or outputting signals.

Operations 1200 begin, at block 1205, with the source BS determining to migrate a child node (e.g., a UE) from a first logical IAB-DU (e.g., DU3*a* illustrated in FIGS. 10 and 11) of an IAB-node (e.g., IAB-node 904 illustrated in FIGS. 10 and 11) to a second logical IAB-DU (e.g., DU3*b* illustrated in FIGS. 10 and 11) of the IAB-node. The child node may be a UE or a child IAB-MT (e.g., MT4 illustrated in FIG. 11).

The first logical IAB-DU may be associated with the source BS (e.g., CU1), and the second logical IAB-DU may be associated with a target BS (e.g., CU2). For example, the first logical IAB-DU may be configured to manage a connection established between the IAB-node and the source BS, and the second logic IAB-DU may be configured to manage a connection established between the IAB-node and the target BS.

At block 1210, the source BS sends, to the target BS, context information of the child node (e.g., UE 902 illustrated in FIG. 10 or IAB-node 1102 illustrated in FIG. 11) served by the first logical IAB-DU in response to the determination. For example, the context information may be information regarding a traffic flow (e.g., radio bearer) between the child node and an IAB-DU of the IAB-node. The context information may include information regarding a BH RLC CH between the child node (e.g., UE 902 or IAB-node 1102) and an IAB-DU of the IAB-node (e.g., IAB-node 904).

At block 1215, the source BS indicates, to the target BS, a traffic mapping configuration at the IAB-node associated with the context information and a backhaul connection of the IAB-node. The traffic mapping configuration may indicate a mapping between a type of traffic flow to be served by the target BS for the child node and a BAP routing ID of a backhaul route at an IAB-MT (e.g., MT3 illustrated in FIGS. 10 and 11) of the IAB-node between the IAB-MT and an IAB-donor-DU (e.g., Donor DU1 illustrated in FIGS. 10 and 11), an egress link (e.g., one of egress links described with respect to FIG. 7) at the IAB-MT of the IAB-node, a BH RLC CH served by the IAB-MT of the IAB-node, or any combination thereof. The traffic flow may include user-plane or control-plane signaling on an F1 interface established by the source BS at the first logical IAB-DU. In some aspects, the context information indicates the type of traffic flow.

In some aspects, the traffic mapping configuration indicates a mapping between (1) a BAP routing ID and a backhaul link between the IAB-node and the child node, (2) the BAP routing ID and a backhaul link between the IAB-node and a parent node (e.g., parent IAB-node 980, also referred to herein as "IAB-node 1") of the IAB-node, (3) the backhaul link between the IAB-node and the child node and the backhaul link between the IAB-node and the parent node of the IAB-node, (4) a BH RLC CH between the IAB-node and the child node, and a BH RLC CH between the IAB-node and the parent node of the IAB-node, or (5) any combination thereof.

Figure 13:
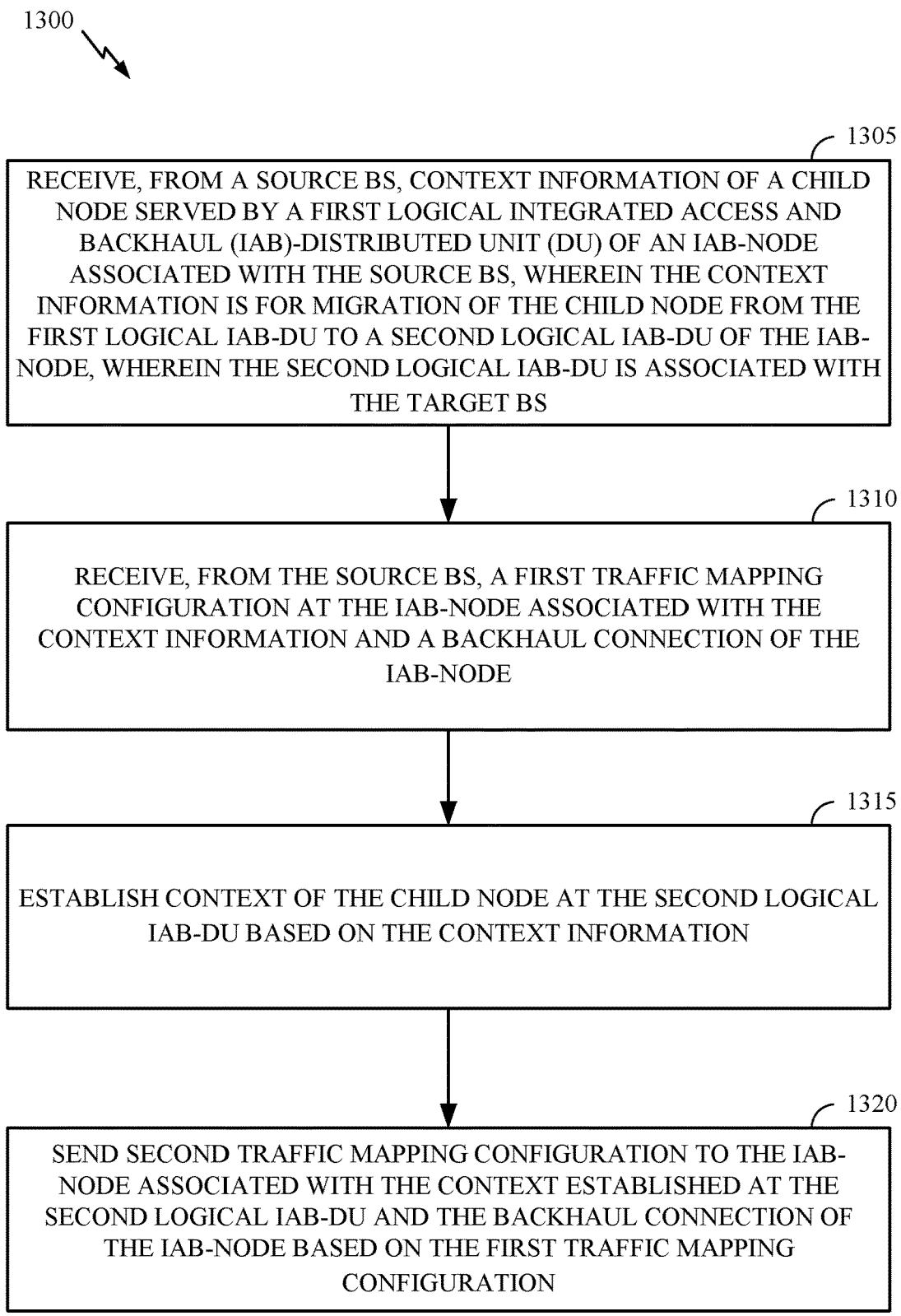
FIG. 13 illustrates a flow diagram illustrating example operations for wireless communication by a target BS, in accordance with certain aspects of the present disclosure.

FIG. 13 is a flow diagram illustrating example operations 1300 for wireless communication by a target BS, in accordance with certain aspects of the present disclosure. Operations 1300 may be performed, for example, by a second IAB-donor-CU (e.g., CU2 described with respect to FIGS. 10 and 11).

Operations 1300 may be implemented as software components that are executed and run on one or more processors (e.g., controller/processor 240 of FIG. 2). Further, the transmission and reception of signals by the target BS in operations 1300 may be enabled, for example, by one or more antennas (e.g., antennas 234 of FIG. 2). In certain aspects, the transmission and/or reception of signals by the target BS may be implemented via a bus interface of one or more processors (e.g., TX MIMO processor 230, transmit processor 220, receive processor 238, controller/processor 240, and scheduler 244) obtaining and/or outputting signals.

Operations 1300 begin, at block 1305, with the target BS receiving, from a source BS (e.g., CU1 illustrated in FIGS. 10 and 11), context information of a child node served by a first logical IAB-DU (e.g., DU3a illustrated in FIGS. 10 and 11) of an IAB-node (e.g., IAB-node 904 illustrated in FIGS. 10 and 11) associated with the source BS. The context information may be for migration of the child node from the first logical IAB-DU to a second logical IAB-DU (e.g., DU3b illustrated in FIGS. 10 and 11) of the IAB-node. The second logical IAB-DU may be associated with the target BS, as described herein.

As described, the context information may include information regarding a traffic flow (e.g., radio bearer) between the child node and an IAB-DU of the IAB-node. The context information may include information of a BH RLC CH between the child node and an IAB-DU of the IAB-node.

At block 1310, the target BS receives, from the source BS, a first traffic mapping configuration at the IAB-node associated with the context information and a backhaul connection of the IAB-node. As described herein, the first traffic mapping configuration indicates a mapping between a type of traffic flow to be served by the target BS for the child node and a BAP routing ID of a backhaul route at an IAB-MT of the IAB-node between the IAB-MT and an IAB-donor-DU (e.g., donor DU1 illustrated in FIGS. 10 and 11), an egress link at the IAB-MT of the IAB-node, a BH RLC CH served by the IAB-MT of the IAB-node, or any combination thereof. In some aspects, the first traffic mapping configuration indicates a mapping between (1) a BAP routing ID and a backhaul link between the IAB-node and the child node, (2) the BAP routing ID and a backhaul link between the IAB-node and a parent node of the IAB-node, (3) the backhaul link between the IAB-node and the child node and the backhaul link between the IAB-node and the parent node of the IAB-node, (4) a BH RLC CH between the IAB-node and the child node, and a BH RLC CH between the IAB-node and the parent node of the IAB-node, (5) or any combination thereof.

At block 1315, the target BS establishes context of the child node at the second logical IAB-DU based on the context information. At block 1320, the target BS sends second traffic mapping configuration to the IAB-node associated with the context established at the second logical IAB-DU and the backhaul connection of the IAB-node based on the first traffic mapping configuration.

For example, the second traffic mapping configuration may indicate a mapping between a type of traffic flow established, at block 1315, at the second logical IAB-DU (e.g., DU3b) and a BAP routing ID indicated in the first traffic mapping configuration for a corresponding type of traffic flow established at the first logical IAB-DU (e.g., DU3a), an egress link at an IAB-MT (e.g., MT3) of the IAB-node indicated in the first traffic mapping configuration for the corresponding type of traffic flow established at the first logical IAB-DU (e.g., DU3a), a BH RLC CH served by the IAB-MT of the IAB-node indicated in the first traffic mapping configuration for the corresponding traffic flow type established at the first logical IAB-DU (e.g., DU3a), or any combination thereof.

In certain aspects, the second traffic mapping configuration may indicate a mapping between a backhaul link between the IAB-node and the child node, and at least one BAP routing ID. For example, the first traffic mapping configuration may map the at least one BAP routing ID to another backhaul link (e.g., an original BH link used prior to migration) between the IAB-node and the child node, the other backhaul link being established for the child node for service by the source BS.

In certain aspects, the second traffic mapping configuration may indicate a mapping between the backhaul link between the IAB-node and a parent node (e.g., parent IAB-node 980) of the IAB-node, and the at least one BAP routing ID. The first traffic mapping configuration may map at least one BAP routing ID to the backhaul link between the IAB-node and the parent node.

In certain aspects, the second traffic mapping configuration may indicate a mapping between the backhaul link between the IAB-node and the child node, and the backhaul link between the IAB-node and the parent node of the IAB-node. The first traffic mapping configuration may map the backhaul link between the IAB-node and the parent node to the other backhaul link between the IAB-node and the child node.

In certain aspects, the second traffic mapping configuration may indicate a mapping between a BH RLC CH between the IAB-node and the child node, and a BH RLC CH between the IAB-node and the parent node of the IAB-node. The first traffic mapping configuration may map the BH RLC CH between the IAB-node and the parent node to another BH RLC CH (e.g., an original BH RLC CH used prior to migration) between the child node and the first logical IAB-DU of the IAB-node, the other BH RLC CH being established for the child node for service by the source BS.

Figure 14:
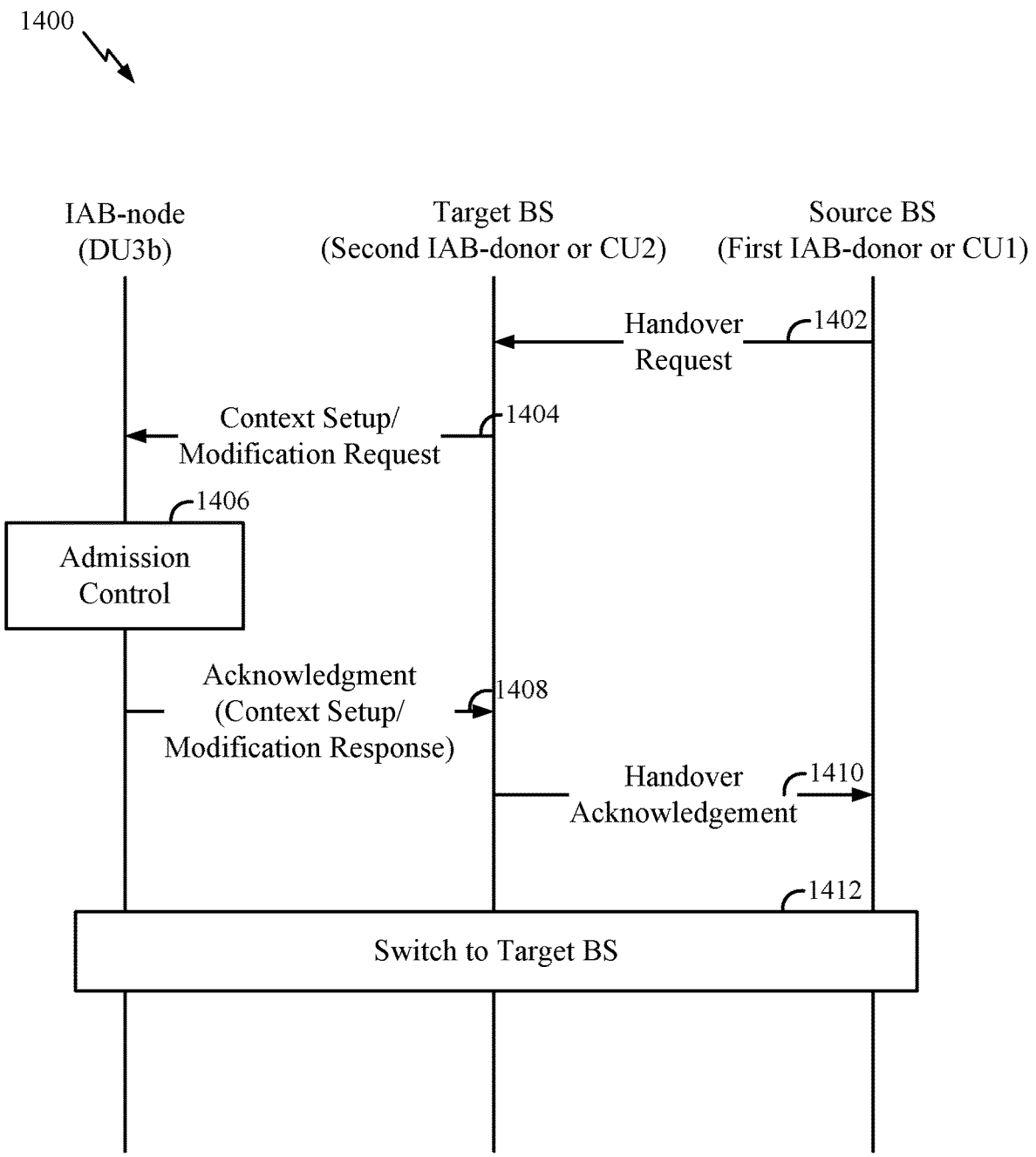
FIG. 14 is a call flow diagram illustrating example operations for handover, in accordance with certain aspects of the present disclosure.

FIG. 14 is a call flow diagram 1400 illustrating example operations for handover, in accordance with certain aspects of the present disclosure. As illustrated, the first IAB-donor-CU (e.g., CU1 of a source BS) may initiate (e.g., send handover request 502) the transfer of context information of a child served by a first logical IAB-DU (e.g. DU3a) of an IAB-node (e.g., IAB-node 904) to a second IAB-donor-CU (e.g., CU2 of a target BS), where the first logical IAB-DU is associated with the first IAB-donor-CU. The first IAB-donor-CU may also indicate (e.g., via the handover request 1402, similar to handover request 502 illustrated in FIG. 5A) to the second IAB-donor-CU first traffic mapping configuration at the IAB-node associated with the transferred context information and a backhaul connection of the IAB-node, as described herein.

Thus, the second IAB-donor-CU receives, from the first IAB-donor-CU, context information of a child node served by the first logical IAB-DU of the IAB-node associated with the first IAB-donor-CU. The second IAB-donor-CU may also receive from the first IAB-donor-CU first traffic mapping configuration at the IAB-node associated with the received context information and a backhaul connection of the IAB-node.

The second IAB-donor CU may then establish (e.g., via context setup/modification request 1404) context of the child at the second logical IAB-DU (e.g. DU3*b*) of the IAB-node associated with the second IAB-donor-CU based on the received context information. The second IAB-donor CU may also provide a second traffic mapping configuration (e.g., via the context setup/modification request 1404) to the IAB-node associated with the context established at the second logical IAB-DU and a backhaul connection of the IAB-node based on the first traffic mapping configuration, as described herein.

At block 1406, DU3*b* may perform admission control operations (e.g., reserve resources for the UE) and provide an acknowledgment 1408 (e.g., context setup/modification response) to second IAB-donor CU. The second IAB-donor CU may then send a handover request acknowledgment 1410 (e.g., similar to handover request acknowledgement illustrated in FIG. 5A) to the first IAB-donor CU. In certain aspects, the first IAB-donor CU triggers the migration of the child node to the second logical IAB-DU of the IAB-node, at block 1412. For example, the first IAB-donor CU may send an RRC reconfiguration message (e.g., RRC reconfiguration message 508) to the child node (e.g., UE) as described with respect to FIG. 5A.

In certain aspects, the child node may be a UE or a child IAB-MT. The context information may comprise information of a traffic flow (e.g. radio bearer) between the child and an IAB-DU of the IAB-node (e.g., applies to both child UE and child IAB-MT). In certain aspects, the context information may comprise information of a BH RLC CH between the child node and an IAB-DU of the IAB-node (e.g., applies only to child IAB-MT).

As described herein, the first traffic mapping configuration may indicate a mapping between a traffic flow type (e.g., F1-U tunnel associated with a first data radio bearer of the child and setup at the first logical IAB-DU or F1-C signaling associated with the child) and a BAP routing ID of a backhaul route at the IAB-MT of the IAB-node (i.e. between the IAB-MT and an IAB-donor-DU), an egress link (next-hop BAP address) at the IAB-MT of the IAB-node, a BH RLC CH served by the IAB-MT of the IAB-node, or any combination thereof.

In certain aspects, the first traffic mapping configuration may indicate a mapping between (1) a BAP routing ID and a backhaul link between the IAB-node and the child, (2) a BAP routing ID and a backhaul link between the IAB-node and a parent of the IAB-node, (3) a backhaul link between the IAB-node and the child and a backhaul link between the IAB-node and a parent of the IAB-node, (4) a BH RLC CH between the IAB-node and the child and a BH RLC CH between the IAB-node and a parent of the IAB-node, or (5) any combination thereof.

In certain aspects, the second traffic mapping configuration may indicate a mapping between the traffic flow type at the second logical IAB-DU (e.g., F1-U tunnel setup by the second IAB-donor-CU (e.g., as part of the child context) at the second logical IAB-DU for the first DRB of the child, F1-C signaling at the second logical IAB-DU associated with the child) and the BAP routing ID indicated in the first traffic mapping configuration for the corresponding traffic flow type at the first logical IAB-DU, the egress link (e.g., next-hop BAP address) at the IAB-MT of the IAB-node indicated in the first traffic mapping configuration for the corresponding traffic flow type at the first logical IAB-DU, the BH RLC CH served by the IAB-MT of the IAB-node indicated in the first traffic mapping configuration for the corresponding traffic flow type at the first logical IAB-DU, or any combination thereof.

The second traffic mapping configuration may indicate a mapping between: the backhaul link between the IAB-node and the child and at least one BAP routing ID mapped in the first traffic mapping configuration to the (original) backhaul link between the IAB-node and the child, the backhaul link between the IAB-node and a parent of the IAB-node and at least one BAP routing ID mapped in the first traffic mapping configuration to the backhaul link between the IAB-node and the parent, the backhaul link between the IAB-node and the child and a backhaul link between the IAB-node and a parent of the IAB-node mapped in the first traffic mapping configuration to the (original) backhaul link between the IAB-node and the child, a BH RLC CH between the IAB-node and the child node (e.g., setup as part of the child context at the second logical IAB-DU) and a BH RLC CH between the IAB-node and a parent of the IAB-node mapped in the first traffic mapping configuration to a BH RLC CH between the child and the first logical IAB-DU of the IAB-node, or any combination thereof.

Example Wireless Communications Devices

Figure 15:
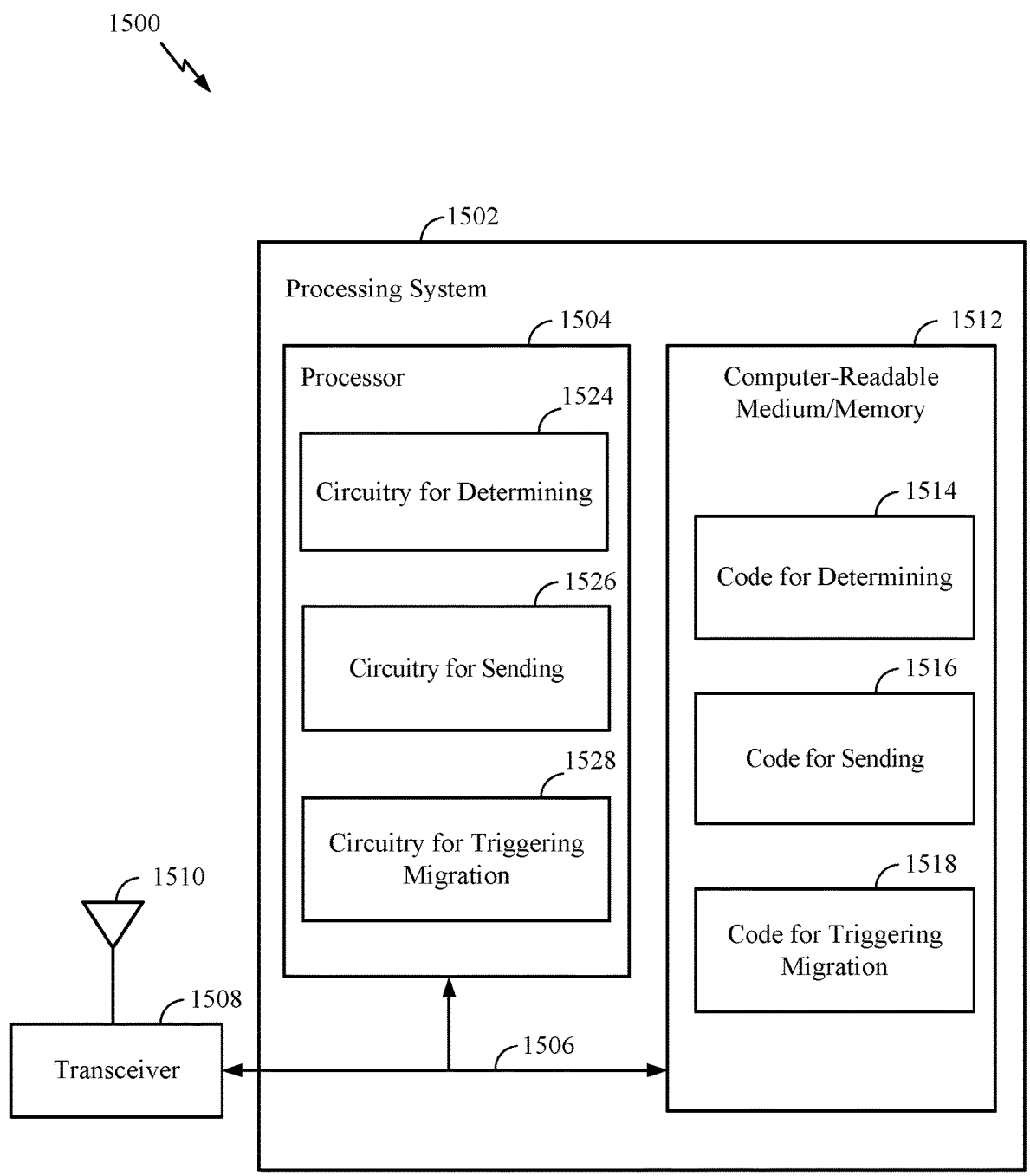
FIG. 15 illustrates a communications device that may include various components configured to perform operations for the techniques disclosed herein, in accordance with certain aspects of the present disclosure.

FIG. 15 illustrates a communications device 1500 that may include various components (e.g., corresponding to means-plus-function components) operable, configured, or adapted to perform operations for the techniques disclosed herein, such as the operations illustrated in FIG. 12. In some examples, communications device 1500 may be a source base station (BS), and more specifically, a first Integrated Access and Backhaul (IAB)-donor-central unit (CU) (e.g., CU1 described with respect to FIGS. 10 and 11).

Communications device 1500 includes a processing system 1502 coupled to a transceiver 1508 (e.g., a transmitter and/or a receiver). Transceiver 1508 is configured to transmit and receive signals for communications device 1500 via an antenna 1510, such as the various signals as described herein. Transceiver 1508 can, for example, include one or more components of UE 120 with reference to FIG. 2, including, for example, demodulators in transceivers 254, MIMO detector 256, receive processor 258, transmit processor 264, TX MIMO processor 266, and/or the like. Additionally or alternatively, the transceiver 1508 can, for example, include one or more components of BS 110 with reference to FIG. 2, including, for example, demodulators 232, TX MIMO processor 230, transmit processor 220, MIMO detector 236, receive processor 238, and/or the like. Processing system 1502 may be configured to perform processing functions for communications device 1500, including processing signals received and/or to be transmitted by communications device 1500.

Processing system 1502 includes a processor 1504 coupled to a computer-readable medium/memory 1512 via a bus 1506. In certain aspects, computer-readable medium/memory 1512 is configured to store instructions (e.g., computer-executable code) that when executed by processor 1504, cause processor 1504 to perform the operations illustrated in FIG. 12, or other operations for performing the various techniques discussed herein for admission control in an IAB network.

In certain aspects, computer-readable medium/memory 1512 stores code 1514 (an example means for) for determining; code 1516 (an example means for) for sending (or indicating); and optionally code 1518 (an example means for) for triggering migration.

In certain aspects, code 1514 for determining may include code for determining to migrate a child node from a first logical IAB-distributed unit (DU) of an IAB-node to a second logical IAB-DU of the IAB-node, wherein the first logical IAB-DU is associated with the source BS, and wherein the second logical IAB-DU is associated with a target BS.

In certain aspects, code 1516 for sending (or indicating) may include code for sending, to the target BS, context information of the child node served by the first logical IAB-DU in response to the determination. In certain aspects, code 1516 for indicating may include code for indicating, to the target BS, a traffic mapping configuration at the IAB-node associated with the context information and a backhaul connection of the IAB-node.

In certain aspects, processor 1504 has circuitry configured to implement the code stored in the computer-readable medium/memory 1512. Processor 1504 includes circuitry 1524 (an example means for) for determining; circuitry 1526 (an example means for) for sending (or indicating); and optionally circuitry 1528 (an example means for) for triggering migration.

In certain aspects, circuitry 1524 for determining may include circuitry for determining to migrate a child node from a first logical IAB-distributed unit (DU) of an IAB-node to a second logical IAB-DU of the IAB-node, wherein the first logical IAB-DU is associated with the source BS, and wherein the second logical IAB-DU is associated with a target BS.

In certain aspects, circuitry 1526 for sending (or indicating) may include circuitry for sending, to the target BS, context information of the child node served by the first logical IAB-DU in response to the determination. In certain aspects, circuitry 1526 for indicating may include circuitry for indicating, to the target BS, a traffic mapping configuration at the IAB-node associated with the context information and a backhaul connection of the IAB-node.

In some cases, the operations illustrated in FIG. 12, as well as other operations described herein, may be implemented by one or more means-plus-function components. For example, in some cases, such operations may be implemented by means for determining, means for sending, means for indicating, and means for triggering migration.

Means for transmitting, indicating, or sending (or means for outputting for transmission) may include a transmitter and/or an antenna(s) 234 of BS 110 or transmitter and/or antenna(s) 252 of UE 120 illustrated in FIG. 2, circuitry 1526 of communications device 1500 illustrated in FIG. 15, and/or transceiver 1508 of communications device 1500 illustrated in FIG. 15. Means for receiving (or means for obtaining) may include a receiver and/or an antenna(s) 234 of BS 110 or a receiver and/or antenna(s) 252 of UE 120 illustrated in FIG. 2 and/or transceiver 1508 of communications device 1500 illustrated in FIG. 15.

Means for determining and means for establishing context may include a processing system, which may include one or more processors, such as transmit processor 220, TX MIMO processor 230, receive processor 238, and/or controller/processor 240 of BS 110 or receive processor 258, transmit processor 264, TX MIMO processor 266, and/or controller/processor 280 of UE 120 illustrated in FIG. 2 and/or processing system 1502 of the communication device 1500 in FIG. 15. Further, means for determining may include circuitry 1524 of communications device 1500 illustrated in FIG. 15.

Notably, FIG. 15 is just one example, and many other examples and configurations of communications device 1500 are possible.

Figure 16:
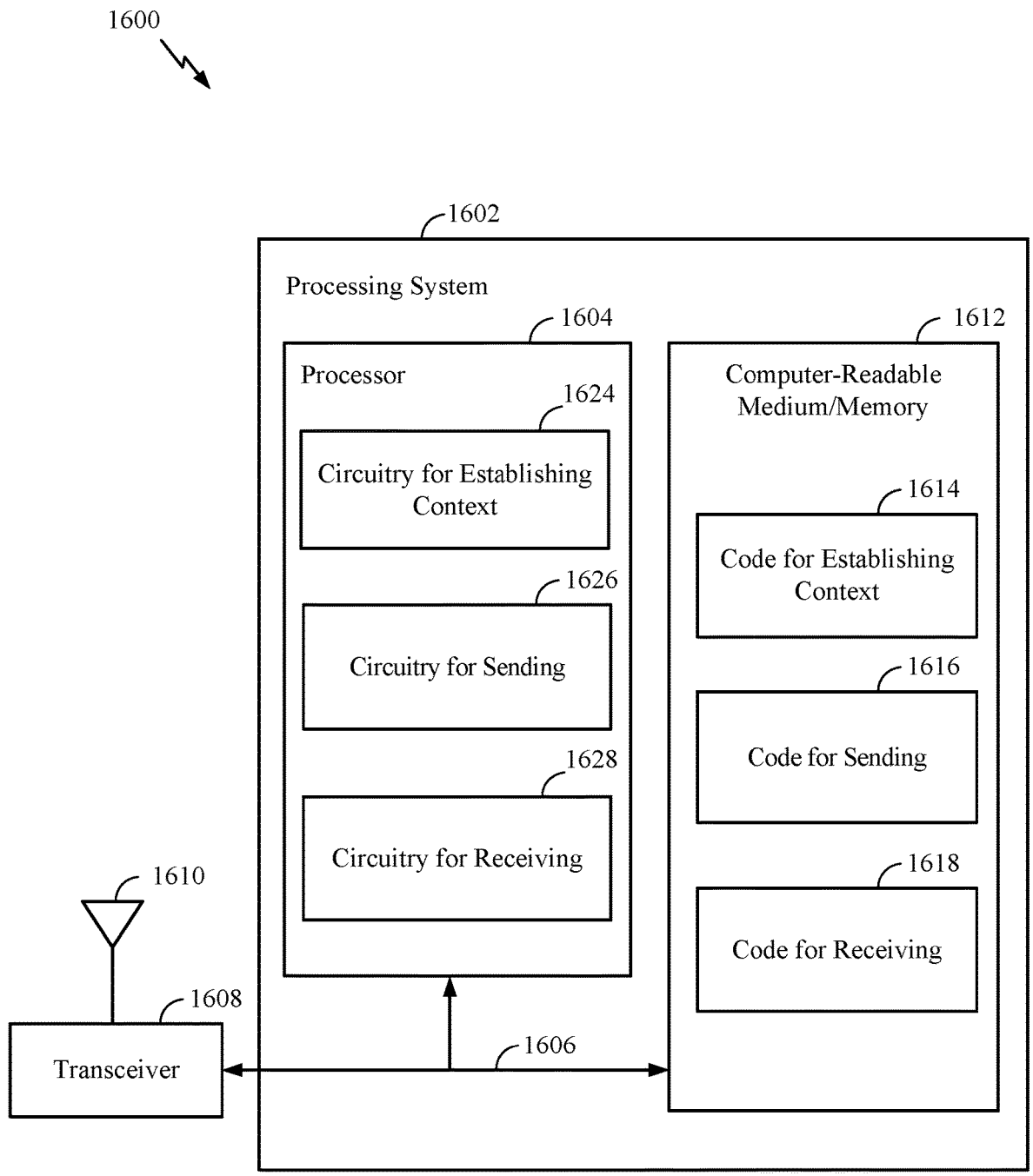
FIG. 16 illustrates a communications device that may include various components configured to perform operations for the techniques disclosed herein, in accordance with certain aspects of the present disclosure.

FIG. 16 illustrates a communications device 1600 that may include various components (e.g., corresponding to means-plus-function components) operable, configured, or adapted to perform operations for the techniques disclosed herein, such as the operations illustrated in FIG. 13. In some examples, communications device 1600 may be a target BS, and more specifically, a second IAB-donor-CU (e.g., CU2 described with respect to FIGS. 10 and 11).

Communications device 1600 includes a processing system 1602 coupled to a transceiver 1608 (e.g., a transmitter and/or a receiver). Transceiver 1608 is configured to transmit and receive signals for communications device 1600 via an antenna 1610, such as the various signals as described herein. Transceiver 1608 can, for example, include one or more components of UE 120 with reference to FIG. 2, including, for example, demodulators in transceivers 254, MIMO detector 256, receive processor 258, transmit processor 264, TX MIMO processor 266, and/or the like. Additionally or alternatively, transceiver 1608 can, for example, include one or more components of BS 110 with reference to FIG. 2, including, for example, demodulators 232, TX MIMO processor 230, transmit processor 220, MIMO detector 236, receive processor 238, and/or the like. Processing system 1602 may be configured to perform processing functions for communications device 1600, including processing signals received and/or to be transmitted by communications device 1600.

Processing system 1602 includes a processor 1604 coupled to a computer-readable medium/memory 1612 via a bus 1606. In certain aspects, computer-readable medium/memory 1612 is configured to store instructions (e.g., computer-executable code) that when executed by processor 1604, cause processor 1604 to perform the operations illustrated in FIG. 13, or other operations for performing the various techniques discussed herein for admission control in an IAB network.

In certain aspects, computer-readable medium/memory 1612 stores code 1614 (an example means for) for establishing context; code 1616 (an example means for) for sending; and code 1618 (an example means for) for receiving.

In certain aspects, code 1614 for establishing context may include code for establishing context of the child node at the second logical IAB-DU based on the context information.

In certain aspects, code 1616 for sending may include code for sending second traffic mapping configuration to the IAB-node associated with the context established at the second logical IAB-DU and the backhaul connection of the IAB-node based on the first traffic mapping configuration.

In certain aspects, code 1618 for receiving may include code for receiving, from a source BS, context information of a child node served by a first logical IAB-DU of an IAB-node associated with the source BS, wherein the context information is for migration of the child node from the first logical IAB-DU to a second logical IAB-DU of the IAB-node, wherein the second logical IAB-DU is associated with the target BS. In certain aspects, code 1618 for receiving may include code for receiving, from the source BS, a first traffic mapping configuration at the IAB-node associated with the context information and a backhaul connection of the IAB-node.

In certain aspects, processor 1604 has circuitry configured to implement the code stored in the computer-readable medium/memory 1612. Processor 1604 includes circuitry 1624 (an example means for) for establishing context; circuitry 1626 (an example means for) for sending; and circuitry 1628 (an example means for) for receiving.

In certain aspects, circuitry 1624 for establishing context may include circuitry for establishing context of the child node at the second logical IAB-DU based on the context information.

In certain aspects, circuitry 1626 for sending may include circuitry for sending second traffic mapping configuration to the IAB-node associated with the context established at the second logical IAB-DU and the backhaul connection of the IAB-node based on the first traffic mapping configuration.

In certain aspects, circuitry 1628 for receiving may include circuitry for receiving, from a source BS, context information of a child node served by a first logical IAB-DU of an IAB-node associated with the source BS, wherein the context information is for migration of the child node from the first logical IAB-DU to a second logical IAB-DU of the IAB-node, wherein the second logical IAB-DU is associated with the target BS. In certain aspects, circuitry 1628 for receiving may include circuitry for receiving, from the source BS, a first traffic mapping configuration at the IAB-node associated with the context information and a backhaul connection of the IAB-node.

In some cases, the operations illustrated in FIG. 13, as well as other operations described herein, may be implemented by one or more means-plus-function components. For example, in some cases, such operations may be implemented by means for establishing context, means for sending, and means for receiving.

Means for transmitting or sending (or means for outputting for transmission) may include a transmitter and/or an antenna(s) 234 of BS 110 or transmitter and/or antenna(s) 252 of UE 120 illustrated in FIG. 2 and/or circuitry 1626 and/or transceiver 1608 of communications device 1600 in FIG. 16. Means for receiving (or means for obtaining) may include a receiver and/or an antenna(s) 234 of BS 110 or a receiver and/or antenna(s) 252 of UE 120 illustrated in FIG. 2 and/or circuitry 1628 and/or transceiver 1608 of communications device 1600 in FIG. 16.

Means for establishing context may include a processing system, which may include one or more processors, such as transmit processor 220, TX MIMO processor 230, receive processor 238, and/or controller/processor 240 of BS 110 or receive processor 258, transmit processor 264, TX MIMO processor 266, and/or controller/processor 280 of UE 120 illustrated in FIG. 2 and/or processing system 1602 of communications device 1600 in FIG. 16.

Notably, FIG. 16 is just one example, and many other examples and configurations of communications device 1600 are possible.

Example Aspects

Implementation examples are described in the following numbered aspects:

Aspect 1. A method for wireless communication by a target base station (BS), comprising: receiving, from a source BS, context information of a child node served by a first logical Integrated Access and Backhaul (IAB)-distributed unit (DU) of an IAB-node associated with the source BS, wherein the context information is for migration of the child node from the first logical IAB-DU to a second logical IAB-DU of the IAB-node, wherein the second logical IAB-DU is associated with the target BS; receiving, from the source BS, a first traffic mapping configuration at the IAB-node associated with the context information and a backhaul connection of the IAB-node; establishing context of the child node at the second logical IAB-DU based on the context information; and sending second traffic mapping configuration to the IAB-node associated with the context established at the second logical IAB-DU and the backhaul connection of the IAB-node based on the first traffic mapping configuration.

Aspect 2. The method of aspect 1, wherein the source BS comprises a first IAB donor central unit (CU), and wherein the target BS comprises a second IAB donor CU.

Aspect 3. The method of any of aspects 1-2, wherein the first logical IAB-DU is configured to manage a connection established between the IAB-node and the source BS, and wherein the second logic IAB-DU is configured to manage a connection established between the IAB-node and the target BS.

Aspect 4. The method of any of aspects 1-3, wherein the child node comprises a UE or a child IAB-mobile terminal (MT).

Aspect 5. The method of any of aspects 1-4, wherein the context information comprises information regarding a traffic flow between the child node and an IAB-DU of the IAB-node.

Aspect 6. The method of aspect 5, wherein the traffic flow is associated with a radio bearer.

Aspect 7. The method of any of aspects 1-6, wherein the context information comprises information of a backhaul (BH) radio link control (RLC) channel (CH) between the child node and an IAB-DU of the IAB-node.

Aspect 8. The method of any of aspects 1-7, wherein the first traffic mapping configuration indicates a mapping between a type of traffic flow to be served by the target base station for the child node and: a backhaul adaptation protocol (BAP) routing ID of a backhaul route at an IAB-MT of the IAB-node between the IAB-MT and an IAB-donor-DU; an egress link at the IAB-MT of the IAB-node; a BH RLC CH served by the IAB-MT of the IAB-node; or any combination thereof.

Aspect 9. The method of aspect 8, wherein the traffic flow comprises user-plane or control-plane signaling on an F1 interface signaling established by the source BS at the first logical IAB-DU.

Aspect 10. The method of any of aspects 8-9, wherein the context information indicates the type of traffic flow.

Aspect 11. The method of any of aspects 1-10, wherein the first traffic mapping configuration indicates a mapping between: a BAP routing ID and a backhaul link between the IAB-node and the child node; the BAP routing ID and a backhaul link between the IAB-node and a parent node of the IAB-node; the backhaul link between the IAB-node and the child node and the backhaul link between the IAB-node and the parent node of the IAB-node; a BH RLC CH between the IAB-node and the child node, and a BH RLC CH between the IAB-node and the parent node of the IAB-node; or any combination thereof.

Aspect 12. The method of any of aspects 1-11, wherein the second traffic mapping configuration indicates a mapping between a type of traffic flow established at the second logical IAB-DU and: a BAP routing ID indicated in the first traffic mapping configuration for a corresponding type of traffic flow established at the first logical IAB-DU; an egress link at an IAB-MT of the IAB-node indicated in the first traffic mapping configuration for the corresponding type of traffic flow established at the first logical IAB-DU; a BH RLC CH served by the IAB-MT of the IAB-node indicated in the first traffic mapping configuration for the corresponding traffic flow type established at the first logical IAB-DU; or any combination thereof.

Aspect 13. The method of aspect 12, wherein the traffic flow comprises user-plane or control-plane signaling on an F1 interface established by the target BS at the second logical IAB-DU.

Aspect 14. The method of any of aspects 1-13, wherein the second traffic mapping configuration indicates a mapping between: a backhaul link between the IAB-node and the child node, and at least one BAP routing ID, wherein the first traffic mapping configuration maps the at least one BAP routing ID to another backhaul link between the IAB-node and the child node, the other backhaul link being established for the child node for service by the source BS; the backhaul link between the IAB-node and a parent node of the IAB-node, and the at least one BAP routing ID, wherein the first traffic mapping configuration maps the at least one BAP routing ID to the backhaul link between the IAB-node and the parent node; the backhaul link between the IAB-node and the child node, and the backhaul link between the IAB-node and the parent node of the IAB-node, wherein the first traffic mapping configuration maps the backhaul link between the IAB-node and the parent node to the other backhaul link between the IAB-node and the child node; a BH RLC CH between the IAB-node and the child node, and a BH RLC CH between the IAB-node and the parent node of the IAB-node, wherein the first traffic mapping configuration maps the BH RLC CH between the IAB-node and the parent node to another BH RLC CH between the child node and the first logical IAB-DU of the IAB-node, the other BH RLC CH being established for the child node for service by the source BS; or any combination thereof.

Aspect 15. A method for wireless communication by a source base station (BS), comprising: determining to migrate a child node from a first logical Integrated Access and Backhaul (IAB)-distributed unit (DU) of an IAB-node to a second logical IAB-DU of the IAB-node, wherein the first logical IAB-DU is associated with the source BS, and wherein the second logical IAB-DU is associated with a target BS; sending, to the target BS, context information of the child node served by the first logical IAB-DU in response to the determination; and indicating, to the target BS, a traffic mapping configuration at the IAB-node associated with the context information and a backhaul connection of the IAB-node.

Aspect 16. The method of aspect 15, wherein the source BS comprises a first IAB donor central unit (CU), and wherein the target BS comprises a second IAB donor CU.

Aspect 17. The method of any of aspects 15-16, wherein the first logical IAB-DU is configured to manage a connection established between the IAB-node and the source BS, and wherein the second logic IAB-DU is configured to manage a connection established between the IAB-node and the target BS.

Aspect 18. The method of any of aspects 15-17, wherein the child node comprises a UE or a child IAB-mobile terminal (MT).

Aspect 19. The method of any of aspects 15-18, wherein the context information comprises information regarding a traffic flow between the child node and an IAB-DU of the IAB-node.

Aspect 20. The method of aspect 19, wherein the traffic flow is associated with a radio bearer.

Aspect 21. The method of any of aspects 15-20, wherein the context information comprises information of a backhaul (BH) radio link control (RLC) channel (CH) between the child node and an IAB-DU of the IAB-node.

Aspect 22. The method of any of aspects 15-21, wherein the traffic mapping configuration indicates a mapping between a type of traffic flow to be served by the target BS for the child node and: a backhaul adaptation protocol (BAP) routing ID of a backhaul route at an IAB-MT of the IAB-node between the IAB-MT and an IAB-donor-DU; an egress link at the IAB-MT of the IAB-node; a BH RLC CH served by the IAB-MT of the IAB-node; or any combination thereof.

Aspect 23. The method of aspect 22, wherein the traffic flow comprises user-plane or control-plane signaling on an F1 interface established by the source BS at the first logical IAB-DU.

Aspect 24. The method of any of aspects 22-23, wherein the context information indicates the type of traffic flow.

Aspect 25. The method of any of aspects 15-24, wherein the traffic mapping configuration indicates a mapping between: a BAP routing ID and a backhaul link between the IAB-node and the child node; the BAP routing ID and a backhaul link between the IAB-node and a parent node of the IAB-node; the backhaul link between the IAB-node and the child node and the backhaul link between the IAB-node and the parent node of the IAB-node; a BH RLC CH between the IAB-node and the child node, and a BH RLC CH between the IAB-node and the parent node of the IAB-node; or any combination thereof.

Aspect 26. An apparatus comprising means for performing the method of any of aspects 1 through 25.

Aspect 27. An apparatus comprising at least one processor and a memory coupled to the at least one processor, the memory comprising code executable by the at least one processor to cause the apparatus to perform the method of any of aspects 1 through 25.

Aspect 28. A computer readable medium storing computer executable code thereon for wireless communications that, when executed by at least one processor, cause an apparatus to perform the method of any of aspects 1 through 25.

Additional Considerations

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA.

UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 miliseconds (ms) subframe.

NR may utilize OFDM with a CP on the UL and DL and include support for half-duplex operation using time division duplexing (TDD). In NR, a subframe is still 1 ms, but the basic TTI is referred to as a slot. A subframe contains a variable number of slots (e.g., 1, 2, 4, 8, 16, . . . slots) depending on the subcarrier spacing (SCS). The NR resource block (RB) is 12 consecutive frequency subcarriers. NR may support a base SCS of 15 KHz and other SCS may be defined with respect to the base SCS, for example, 30 kHz, 60 kHz, 120 kHz, 240 kHz, etc. The symbol and slot lengths scale with the SCS. The CP length also depends on the SCS. Beamforming may be supported and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein.

A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system. For example, in some cases, processors such as those shown in FIG. 2 may be configured to perform operations 1200 of FIG. 12 and/or operations 1300 of FIG. 13.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a target base station (BS), comprising:
receiving, from a source BS, context information of a child node served by a first logical Integrated Access and Backhaul (IAB)-distributed unit (DU) of an IAB-node associated with the source BS, wherein the context information is for migration of the child node from the first logical IAB-DU to a second logical IAB-DU of the IAB-node, wherein the second logical IAB-DU is associated with the target BS;
receiving, from the source BS, a first traffic mapping configuration at the IAB-node associated with the context information and a backhaul connection of the IAB-node;
establishing context of the child node at the second logical IAB-DU based on the context information; and
sending second traffic mapping configuration to the IAB-node associated with the context established at the second logical IAB-DU and the backhaul connection of the IAB-node based on the first traffic mapping configuration.

2. The method of claim 1, wherein the source BS comprises a first IAB donor central unit (CU), and wherein the target BS comprises a second IAB donor CU.

3. The method of claim 1, wherein the first logical IAB-DU is configured to manage a connection established between the IAB-node and the source BS, and wherein the second logic IAB-DU is configured to manage a connection established between the IAB-node and the target BS.

4. The method of claim 1, wherein the child node comprises a UE or a child IAB-mobile terminal (MT).

5. The method of claim 1, wherein the context information comprises information regarding a traffic flow between the child node and an IAB-DU of the IAB-node.

6. The method of claim 5, wherein the traffic flow is associated with a radio bearer.

7. The method of claim 1, wherein the context information comprises information of a backhaul (BH) radio link control (RLC) channel (CH) between the child node and an IAB-DU of the IAB-node.

8. The method of claim 1, wherein the first traffic mapping configuration indicates a mapping between a type of traffic flow to be served by the target base station for the child node and:
- a backhaul adaptation protocol (BAP) routing ID of a backhaul route at an IAB-MT of the IAB-node between the IAB-MT and an IAB-donor-DU;
- an egress link at the IAB-MT of the IAB-node;
- a BH RLC CH served by the IAB-MT of the IAB-node; or
- any combination thereof.

9. The method of claim 8, wherein the traffic flow comprises user-plane or control-plane signaling on an F1 interface signaling established by the source BS at the first logical IAB-DU.

10. The method of claim 8, wherein the context information indicates the type of traffic flow.

11. The method of claim 1, wherein the first traffic mapping configuration indicates a mapping between:
- a BAP routing ID and a backhaul link between the IAB-node and the child node;
- the BAP routing ID and a backhaul link between the IAB-node and a parent node of the IAB-node;
- the backhaul link between the IAB-node and the child node and the backhaul link between the IAB-node and the parent node of the IAB-node;
- a BH RLC CH between the IAB-node and the child node, and a BH RLC CH between the IAB-node and the parent node of the IAB-node; or
- any combination thereof.

12. The method of claim 1, wherein the second traffic mapping configuration indicates a mapping between a type of traffic flow established at the second logical IAB-DU and:
- a BAP routing ID indicated in the first traffic mapping configuration for a corresponding type of traffic flow established at the first logical IAB-DU;
- an egress link at an IAB-MT of the IAB-node indicated in the first traffic mapping configuration for the corresponding type of traffic flow established at the first logical IAB-DU;
- a BH RLC CH served by the IAB-MT of the IAB-node indicated in the first traffic mapping configuration for the corresponding type of traffic flow established at the first logical IAB-DU; or
- any combination thereof.

13. The method of claim 12, wherein the traffic flow comprises user-plane or control-plane signaling on an F1 interface established by the target BS at the second logical IAB-DU.

14. The method of claim 1, wherein the second traffic mapping configuration indicates a mapping between:
- a backhaul link between the IAB-node and the child node, and at least one BAP routing ID, wherein the first traffic mapping configuration maps the at least one BAP routing ID to another backhaul link between the IAB-node and the child node, the other backhaul link being established for the child node for service by the source BS;
- the backhaul link between the IAB-node and a parent node of the IAB-node, and the at least one BAP routing ID, wherein the first traffic mapping configuration maps the at least one BAP routing ID to the backhaul link between the IAB-node and the parent node;
- the backhaul link between the IAB-node and the child node, and the backhaul link between the IAB-node and the parent node of the IAB-node, wherein the first traffic mapping configuration maps the backhaul link between the IAB-node and the parent node to the other backhaul link between the IAB-node and the child node;
- a BH RLC CH between the IAB-node and the child node, and a BH RLC CH between the IAB-node and the parent node of the IAB-node, wherein the first traffic mapping configuration maps the BH RLC CH between the IAB-node and the parent node to another BH RLC CH between the child node and the first logical IAB-DU of the IAB-node, the other BH RLC CH being established for the child node for service by the source BS; or
- any combination thereof.

15. A method for wireless communication by a source base station (BS), comprising:
- determining to migrate a child node from a first logical Integrated Access and Backhaul (IAB)-distributed unit (DU) of an IAB-node to a second logical IAB-DU of the IAB-node, wherein the first logical IAB-DU is associated with the source BS, and wherein the second logical IAB-DU is associated with a target BS;
- sending, to the target BS, context information of the child node served by the first logical IAB-DU in response to the determination; and
- indicating, to the target BS, a traffic mapping configuration at the IAB-node associated with the context information and a backhaul connection of the IAB-node.

16. The method of claim 15, wherein the source BS comprises a first IAB donor central unit (CU), and wherein the target BS comprises a second IAB donor CU.

17. The method of claim 15, wherein the first logical IAB-DU is configured to manage a connection established between the IAB-node and the source BS, and wherein the second logic IAB-DU is configured to manage a connection established between the IAB-node and the target BS.

18. The method of claim 15, wherein the child node comprises a UE or a child IAB-mobile terminal (MT).

19. The method of claim 15, wherein the context information comprises information regarding a traffic flow between the child node and an IAB-DU of the IAB-node.

20. The method of claim 19, wherein the traffic flow is associated with a radio bearer.

21. The method of claim 15, wherein the context information comprises information of a backhaul (BH) radio link control (RLC) channel (CH) between the child node and an IAB-DU of the IAB-node.

22. The method of claim 15, wherein the traffic mapping configuration indicates a mapping between a type of traffic flow to be served by the target BS for the child node and:
- a backhaul adaptation protocol (BAP) routing ID of a backhaul route at an IAB-MT of the IAB-node between the IAB-MT and an IAB-donor-DU;
- an egress link at the IAB-MT of the IAB-node;
- a BH RLC CH served by the IAB-MT of the IAB-node; or
- any combination thereof.

23. The method of claim 22, wherein the traffic flow comprises user-plane or control-plane signaling on an F1 interface established by the source BS at the first logical IAB-DU.

24. The method of claim 22, wherein the context information indicates the type of traffic flow.

25. The method of claim 15, wherein the traffic mapping configuration indicates a mapping between:
- a BAP routing ID and a backhaul link between the IAB-node and the child node;
- the BAP routing ID and a backhaul link between the IAB-node and a parent node of the IAB-node;
- the backhaul link between the IAB-node and the child node and the backhaul link between the IAB-node and the parent node of the IAB-node;
- a BH RLC CH between the IAB-node and the child node, and a BH RLC CH between the IAB-node and the parent node of the IAB-node; or
- any combination thereof.

26. An apparatus for wireless communication by a target base station (BS), comprising:
- a memory; and
- one or more processors coupled to the memory, the memory and the one or more processors being configured to:
  - receive, from a source BS, context information of a child node served by a first logical Integrated Access and Backhaul (IAB)-distributed unit (DU) of an IAB-node associated with the source BS, wherein the context information is for migration of the child node from the first logical IAB-DU to a second logical IAB-DU of the IAB-node, wherein the second logical IAB-DU is associated with the target BS;
  - receive, from the source BS, a first traffic mapping configuration at the IAB-node associated with the context information and a backhaul connection of the IAB-node;
  - establish context of the child node at the second logical IAB-DU based on the context information; and
  - send second traffic mapping configuration to the IAB-node associated with the context established at the second logical IAB-DU and the backhaul connection of the IAB-node based on the first traffic mapping configuration.

27. The apparatus of claim 26, wherein the source BS comprises a first IAB donor central unit (CU), and wherein the target BS comprises a second IAB donor CU.

28. The apparatus of claim 26, wherein the first logical IAB-DU is configured to manage a connection established between the IAB-node and the source BS, and wherein the second logic IAB-DU is configured to manage a connection established between the IAB-node and the target BS.

29. An apparatus for wireless communication by a source base station (BS), comprising:
- a memory; and
- one or more processors coupled to the memory, the memory and the one or more processors being configured to:
  - determine to migrate a child node from a first logical Integrated Access and Backhaul (IAB)-distributed unit (DU) of an IAB-node to a second logical IAB-DU of the IAB-node, wherein the first logical IAB-DU is associated with the source BS, and wherein the second logical IAB-DU is associated with a target BS;
  - send, to the target BS, context information of the child node served by the first logical IAB-DU in response to the determination; and
  - indicate, to the target BS, a traffic mapping configuration at the IAB-node associated with the context information and a backhaul connection of the IAB-node.

30. The apparatus of claim 29, wherein the source BS comprises a first IAB donor central unit (CU), and wherein the target BS comprises a second IAB donor CU.

* * * * *